United States Patent
Baron

(10) Patent No.: US 6,901,075 B1
(45) Date of Patent: May 31, 2005

(54) TECHNIQUES FOR PROTECTION OF DATA-COMMUNICATION NETWORKS

(75) Inventor: Elad Baron, Dumont, NJ (US)

(73) Assignee: Whale Communications Ltd., Rosh-Ha'Ayin (IL)

( * ) Notice: Subject to any disclaimer, the term of this patent is extended or adjusted under 35 U.S.C. 154(b) by 0 days.

(21) Appl. No.: 09/623,881

(22) PCT Filed: Mar. 11, 1999

(86) PCT No.: PCT/IB99/00411

§ 371 (c)(1),
(2), (4) Date: Sep. 11, 2000

(87) PCT Pub. No.: WO99/46882

PCT Pub. Date: Sep. 16, 1999

Related U.S. Application Data

(60) Provisional application No. 60/106,111, filed on Oct. 29, 1998, and provisional application No. 60/077,697, filed on Mar. 12, 1998.

(51) Int. Cl.$^7$ .................... H04L 12/28; H04L 12/56; H04J 3/16; H04J 3/22; G06F 15/16
(52) U.S. Cl. ............... 370/401; 370/392; 370/466; 709/231
(58) Field of Search .................. 370/257, 392, 370/401–406, 463–469; 709/231–236; 455/515–552, 432

(56) References Cited

U.S. PATENT DOCUMENTS 5,021,949 A * 6/1991 Morten et al. ............ 709/231
5,305,317 A * 4/1994 Szczepanek ............... 370/257
5,610,905 A * 3/1997 Murthy et al. ............ 370/401
5,613,090 A * 3/1997 Willems .................... 719/329
5,706,286 A * 1/1998 Reiman et al. ........... 370/401
5,732,360 A * 3/1998 Jarett et al. ............ 455/552.1
5,790,541 A * 8/1998 Patrick et al. ........... 370/392

OTHER PUBLICATIONS

Stephen Saunders, *Putting a Lock on Corporate Data*, Data Communications, vol. 25, No. 1, Jan. 1996, pp. 78 and 80.

Norbert Pohlmann, *Gegen Den Grossen Lauschangriff*, Elektrotechnik, vol. 79, No. 12, Dec. 15, 1997, pp. 76–80.

* cited by examiner

*Primary Examiner*—Man U. Phan
(74) *Attorney, Agent, or Firm*—Ropes & Gray LLP

(57) ABSTRACT

Systems and methods for transmitting data between origin and destination networks are provided. Data complying with a first protocol is received at a front end of the origin network. At least one protocol layer of the first protocol is stripped from the received data such that only a portion of the received data is selected for transmission to a front end of the destination network. The selected data is transmitted to the front end of the at least one destination network using a second protocol different from the first protocol. The selected data can be transmitted over the at least one destination network using a third protocol different from the second protocol. Techniques for electrically isolating the origin and destination networks are also provided.

106 Claims, 20 Drawing Sheets

TECHNIQUES FOR PROTECTION OF DATA-COMMUNICATION NETWORKS

This invention claims priority from provisional patent applications Ser. No. 60/077,697, filed on Mar. 12, 1998, entitled "Offline Firewall" and 60/106,111, filed on Oct. 29, 1998, entitled "Method Of Transferring Data-Communication And A Device For Use Therewith", the entire disclosures of which are incorporated by reference herein.

TECHNICAL FIELD

The present invention relates to techniques for providing security in data-communication networks. More specifically, this invention is directed to techniques that provide protected connectivity between different networks to prevent an intruder from exploiting weakness in network protocol(s).

BACKGROUND OF THE INVENTION

Currently, the public at large increasingly uses the Internet as a source of information and for communicating. Thus, many networks, which otherwise desire to maintain a high level of security, need to share or expose limited data/resources, or to import data from parties whom are not trusted, without opening a "hole" into their sensitive resources. For example, in electronic commerce (e-commerce) applications, a company maintaining an "Internet store" would like to expose the "Internet store", but definitely would not be willing to jeopardize the internal accounting database of the company by doing so. In another example, a telecommunication company may want to provide its clients with on line monthly statements, but would not be willing to take the chance of a "hacker" hacking into their telecom switches through this on-line connection. In still another example, a classified military base might want to import weather forecast information without the possibility that sensitive information would leak outside.

Today's methods of connecting networks use technologies developed for general connectivity. These technologies consist of complex communication protocols that were developed to allow interoperability among different software and hardware elements, and to provide flexibility, diversity, robustness and transparency. A major example of such protocols is the TCP/IP (Transmission Control Protocol/Internet Protocol) family of protocols. Other examples of protocols are DECnet, SNA and Novell. Security was not a dominant consideration while developing the technology for general connectivity. Furthermore, security and robustness are, by nature, at least in part contradictory to each other. More specifically, the higher the complexity levels of a system, the greater the chances that it contains some vulnerability when attacked by a hacker.

In order to address the deficiency of security in the general connectivity methods, firewalls were introduced which are generally implemented in complex software. A firewall is typically located at a network node that monitors all communication passing into the network from an external source such as another network. FIG. 1 illustrates an example of a firewall (FW) used to connect an internal network NET2 with an external network NET1. In this example, external network NET1 is a WAN (Wide Area Network) such as the Internet, and NET2 is a LAN (Local Area Network), although the principles of the invention apply to networks generally.

A significant purpose of firewall FW is to block communications from NET1, which are suspected to be hostile. However, this is a patch to the problem and not a real solution, for the following reasons:

1. The firewall is a node in the internal network NET2. As such, the firewall is susceptible to attacks on its operating system, protocols or applications by a hacker. Once the firewall node is taken over, the entire firewall functionality can be overridden and disabled by the hacker. Since the firewall is the last line of defense for entry into the network, when the firewall fails the internal network is exposed.

2. The firewall attempts to be transparent to applications and to be flexible enough for all the configurations the organization of NET2 may require. The firewall also relies entirely on a human to configure the firewall to separate "good" from "bad" communications. Since the needs of the organization using NET2 constantly change, the software configuration of the firewall is constantly changed to accommodate changing needs. As a result of frequent changes, the probability of a mistake being made that could compromise the security of the network increases.

3. The firewall itself must be a complicated system in order to "understand" the communication passing through it. As such, the firewall may contain software bugs or design flaws or unhandled cases that can be exploited by a hacker. In addition, sometimes it is impossible to determine if a communication is valid or not without having access to a broader context which may be unavailable to the firewall.

4. In order to accommodate regular and transparent connectivity, the firewall is usually allowed to pass all kinds of management and internal protocols. Since clients are often unaware of this, they may not take this into consideration when assessing the risks of using the firewall. For example, when importing a file into the network, it is usually necessary to configure the firewall so that it will allow FTP (File Transfer Protocol), TCP, DNS (Domain Name System), ICMP (Internet Control Message Protocol) and other control messages to pass through.

Hence, there is need for a new technology that is built with security in mind from the beginning, and which will provide a very specific and important kind of connectivity between an internal network and an external network.

SUMMARY OF THE PRESENT INVENTION

The word "network" is used in the present invention to be a group of nodes (e.g., computers, storage devices, printers, etc.) connected together using physical and electronic interconnections such that each node is connected to at least one other node either directly or through intermediate links and/or devices, with all nodes complying with certain pre-agreed upon rules generally known as "protocols". A participant node in the network can transfer information to other nodes in the network by complying with network protocols. The connection between source and target generally passes though other participant nodes in the network which route the information to its destination.

One aspect of the present invention involves isolating an internal network from an external network. Ideally, from a security point of view, the two networks should be disconnected. Practically, there needs to be some transport to carry selected information between the networks. To minimize the security risk, this transport should be as "dumb" and simple or "primitive" as possible. Consequently, the present invention introduces the concept of a "primitive network" which is a "barrier" between the internal network and the external network.

A "primitive network" should be understood to mean a network consisting of front-end nodes and optionally, intermediate nodes. The front-end nodes can comprise one or more computers or dedicated hardware. The primitive network (along with its associated protocols, and physical and electronic connections) provide the mechanism for one front-end node to transfer information to any other front-end node (hereinafter, front end or FE). The optional intermediate nodes may be used to assist in the security or flow of information from one front end to another front end.

In some embodiments of the invention, the primitive network follows the rule that there is no electrical connection between the inside of a protected network and the outside at any given time, i.e. the inside and outside are electrically isolated from one another.

An important feature of the primitive network barrier is "breaking" all layers of the protocols on both sides (i.e., the internal and external networks) while allowing selective data carried by those protocols to pass. The primitive network does not support the full protocol stack used in the internal and external networks, but may support an entirely different protocol.

Various advantages and features of the present invention will become more readily apparent to those skilled in the art from the following description thereof, especially when taken in conjunction with the accompanying drawings.

BRIEF DESCRIPTION OF THE DRAWINGS

Reference is made to the attached drawings, wherein elements having the same reference numeral designations represent like elements throughout and wherein.

DETAILED DESCRIPTION OF THE DRAWINGS

Figure 1:
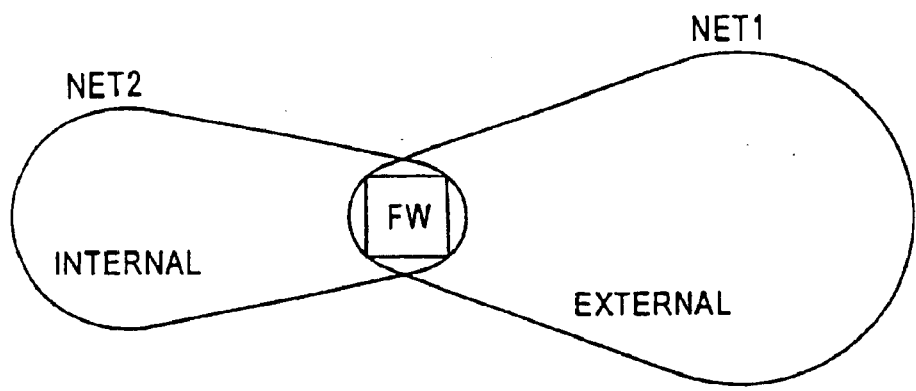
FIG. 1 is an illustration of an internal network connected to an external network using a firewall.
Figure 2:
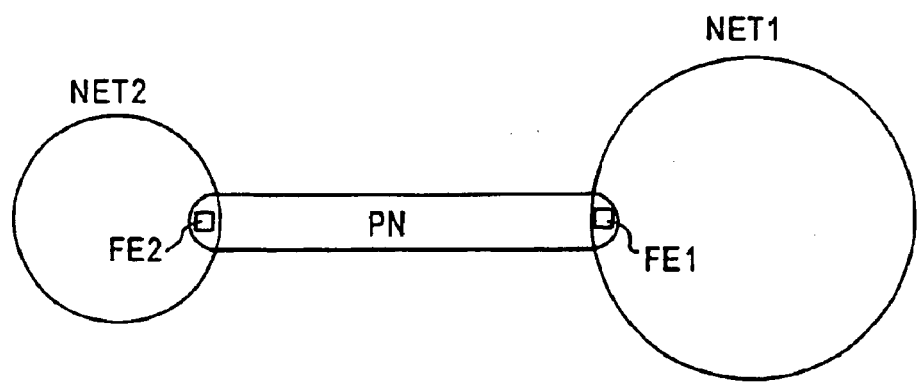
FIG. 2 is an illustration of the internal network connected to the external network with a primitive network according to the present invention.

FIG. 2 illustrates an internal network NET2 (e.g., a LAN) connected to an external network NET1 (e.g., the Internet) using the primitive network PN of the present invention. Both NET1 and NET2 may support various known and/or standardized communications protocols, an example of which is the TCP/IP family of protocols. For the remainder of this description, it will be presumed for simplicity that both NET1 and NET2 use TCP/IP protocols, but it should be understood that NET1 and NET1 can operate with other types of protocols and that the protocols with which NET1 operates need not be the same as the protocols with which NET2 operates. It will be presumed for purposes of explanation that NET1 is the Internet and NET2 is a LAN although it should be understood that other types of network configurations are common and expected.

As noted earlier, the TCP/IP protocols are complex, as they were developed to allow interoperability between different software and hardware elements, and to provide flexibility, diversity, robustness and transparency. Because these protocols are complex, hackers who may connect to NET1 may find ways of "abusing" the protocols (i.e., manipulating the protocols to defeat normal operation) in order to allow them to gain unauthorized entry into NET2. As shown in FIG. 2, to counter such abuse of the protocols of NET1 and NET2, a third network, a protective network, PN, in accordance with the invention is provided which has a front end FE1 connected to NET1 and another front end FE2 connected to NET2. The protective network PN, typically employs a different communication protocol than that of either NET1 or NET2. As discussed more hereinafter, the protocol used in PN can vary. For example, SCSI (Small Computer Systems Interface), SCSI-2, SCSI-3, parallel data port, serial data port USB, RS-232, ethernet (IEEE802.3), token ring (IEEE802.5), FDDI, ATM, fiber channels, etc., or proprietary protocols can be used. While it is preferable that protocol used in the PN should be as simple and "primitive" (uncomplicated) as possible, it is not necessary. For example, it is possible for the PN to use an SNA (System Network Architecture) protocol, which is a complex protocol. All that is needed is for the primitive network to be designed and/or configured to make it practically impossible to take over any front end from any other nodes in the PN, and that it will not support the protocol stack of adjacent networks. For the remainder of this description, it will be presumed that PN uses the SCSI protocol.

FE1 and FE2 each comprise nodes on the primitive network as well as nodes on one or more adjacent networks; i.e., each is a gateway, sitting on 2 networks, and each can include commonly available computers or dedicated machines or hardware. A driver provides operative access to the primitive network. When communications are flowing from FE1 to FE2, one function of the driver in primitive network. When communications are flowing from FE1 to FE2, one function of the driver in the computer at FE1 is to strip the TCP/IP protocols from the data to be transmitted to NET2 and provide that data to the PN for transmission using protocol of the PN (e.g. the SCSI protocol). One function of the driver in FE2 is to strip the SCSI protocol and provide the data for encapsulation using the (exemplary) TCP/IP protocol for transmission over NET2 to the destination. Since communication between NET1 and NET2 in FIG. 2 is intended to be bidirectional, the computer at FE2 also strips the TCP/IP protocols from the data to be transmitted to NET1 and insert the data into the envelopes of the SCSI protocol, and the computer at FE1 also uses its driver to strip the SCSI protocol and format the data into the TCP/IP protocol for transmission over NET1 to the destination.

Figure 3:
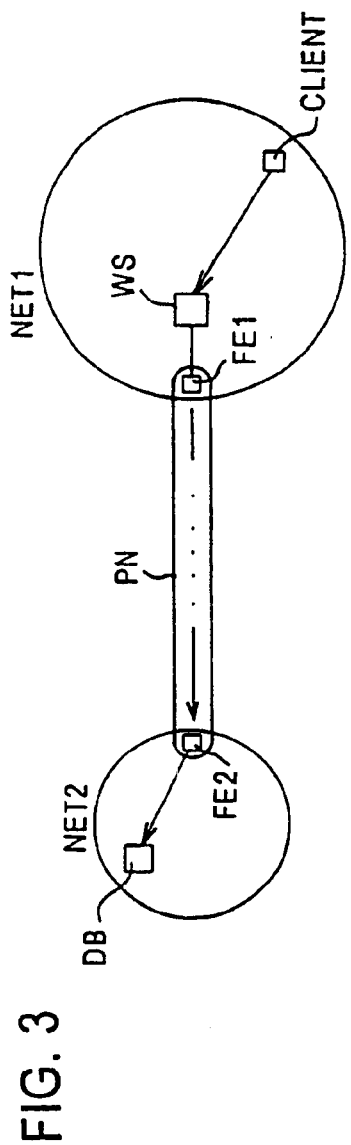
FIG. 3 is an illustration of a client-server application connection for FIG. 2.
Figure 4:
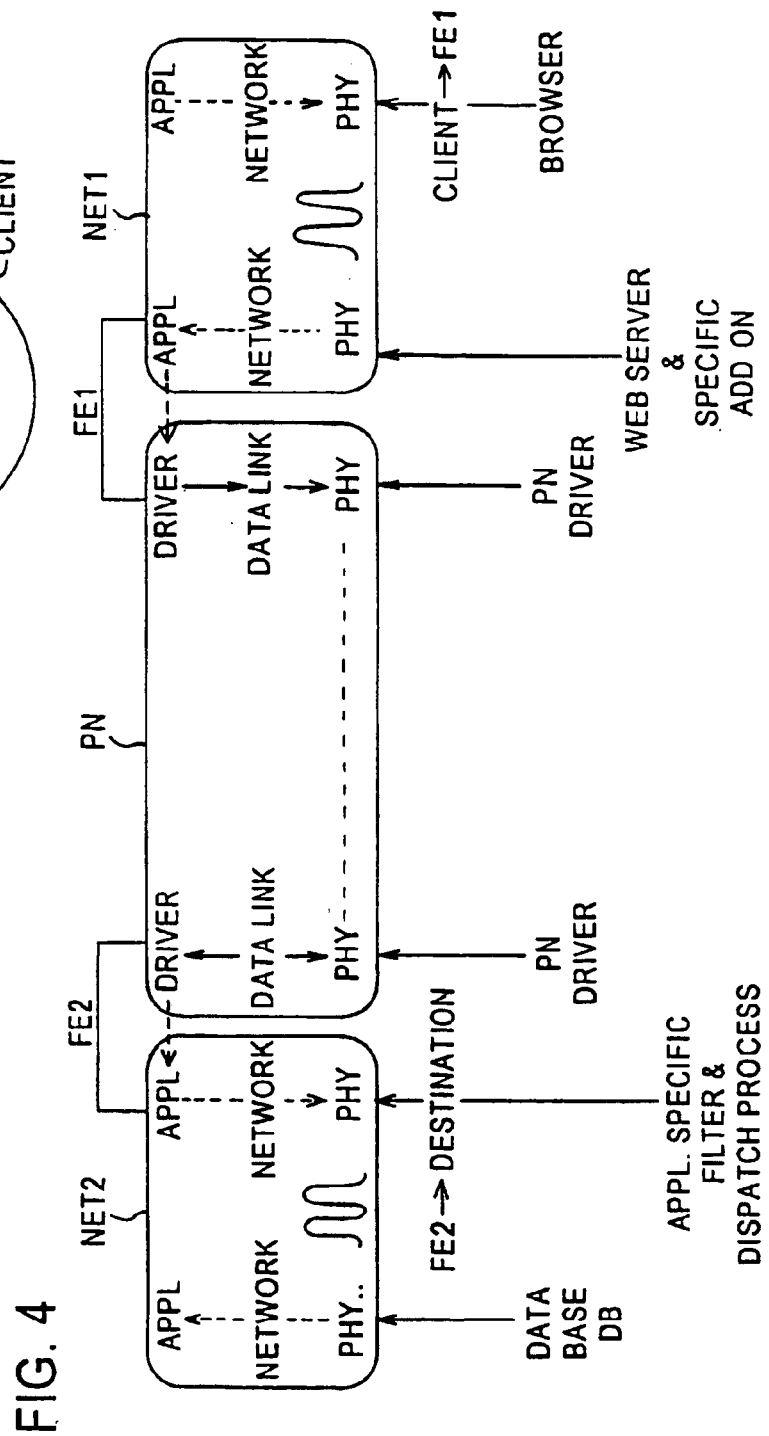
FIG. 4 is an example of client-server application communication flow for FIG. 3.

FIG. 3 illustrates a client-server application connection using the embodiment in FIG. 2, and FIG. 4 is an example of the communication flow for the client-server connection of FIG. 3. We have presumed for purposes of explanation that NET1 is the Internet and NET2 is a protected LAN in the description of many examples. These can be described using the OSI (Open Systems Interconnection) model that is used in the description of the invention. In the OSI framework, groups of protocols are arranged in layers, with each layer performing a specific data communications function. Conceptionally, OSI model is viewed as a vertical stack of layers (seven) with the highest layer being the application layer. At the lowest layer is the physical layer (PRY) which specifies the physical interconnection characteristics for the hardware for sending data over lines. In between these layers are five other layers, each of which specify a certain function. One of these layers is the network layer, which involves routing data packets over the network.

Referring to FIG. 3, assume an electronic commerce WEB based application, where a client is browsing through a merchant catalog and eventually purchases some goods, all through a client browser. The WEB server WS, while geographically residing at the merchant's offices, is actually connected to the Internet (NET1) (possibly through a firewall—not shown in the figure), and is accessible to the entire Internet population via the HTTP (Hyper Text Transfer Protocol) protocol over TCP/IP (the Internet backbone protocol). The merchant's catalog is stored on the WEB server, so the client can browse through the catalog and make his selection using the regular WEB based technologies: the client is shown several high level topics, and chooses one. The client's selection is encoded to an HTTP request by the browser (application level), and is transformed to TCP packet(s) using the TCP/IP stack at the client's computer. The packet moves its way down the protocol stack to the physical layer, and from there to some adjacent computer (possibly the client's Internet Service Provider (ISP)). At that node, the packet goes up only to the routing layer (network layer) which brings it back down to the physical layer, only this time out through another interface to some other adjacent node. The packet continue to advance this way until reaching the WEB server node where the routing layer detects the packet has reached its destination and passes the packet to higher levels. Eventually, the data from the HTTP request is stripped from the underlying protocols, and the WEB server application receives the user's selection (at the application layer). The WEB server then fetches the appropriate catalog page, and builds an HTTP response containing the formatted item. It then sends the response to the client in the same manner described above, over the same TCP/IP link generated by the client's request. The client's browser strips the HTTP envelope (application layer) and displays the information on the client's screen.

The above mechanism continues back and forth, until the client has made his decision to purchase a specific item. The decision about purchasing the specific item is transferred to the server in an HTTP request formatted as always, along with the client's identification details. However, the database containing the client accounts resides in the company's internal network (NET2) and is not accessible to the outside network via any of the TCP/IP based protocols, not even to the WEB server. This is done to protect this important database, and other internal resources, from being abused by a hacker hacking into the internal network by exploiting a weakness in one of the allowed protocols. Of course the WEB server itself must be able to participate in TCP/IP sessions with unknown clients on the Internet. This is what makes the WEB server node a probable target for take-over attempts by hackers. Hence, even the WEB server should not be trusted in the internal network, and should not have inbound TCP/IP capabilities.

Once receiving the purchase order, the WEB server activates some application specific code that passes the data from the purchase order (at the application layer) to the front end's (FE1) driver. The front-end driver passes this information over the primitive network using the protocol(s) of the primitive network, if any. This data is picked up by the front end (FE2) of the internal network (first by its physical layer) and eventually passed via the driver to a specific application which verifies the data corresponds to a valid client and item information. Once the data has been verified, the specific application contacts the internal database to charge the client's account, using standard protocols (e.g. SQLnet over TCP/IP). Packets flow in the internal network in the same manner described from the client to the WEB server. Eventually, the specific application returns an acknowledgment that flows in the opposite direction all the way until received and displayed by the client's browser.

In an alternative implementation, a WEB server is placed in the internal network. The HTTP request information is passed through the primitive network, to a dedicated application that verifies its validity. Only specific requests from a predefined list are approved for internal processing. After a successful validation, the request information is passed to the internal WEB server which process the request as it normally does (and calls user written code that access the database if necessary). The output of the internal WEB server is then passed to the internal network front end and from there it is carried to the external network front end via the primitive network. The external WEB server returns the output to the client's browser, which was unaware of the entire process.

The current invention involves limiting the risks taken when connecting the internal network outside to an external network, to specific, well-known application level risks. In order to make sure that no other communications are passed through between the networks except the approved ones (which would increase the risk), the primitive network (or the internal network FE) can encrypt all inbound communications so that only authorized internal servers that posses the appropriate corresponding decryption key may use the incoming data. In addition, the primitive network (or the internal FE) may check all outgoing communications for a valid digital signature that authenticate their approved origin and block all other transmissions. In this manner, only approved internal processes can communicate through the primitive network PN and be the destination of transmissions passed through the primitive network.

Figure 5:
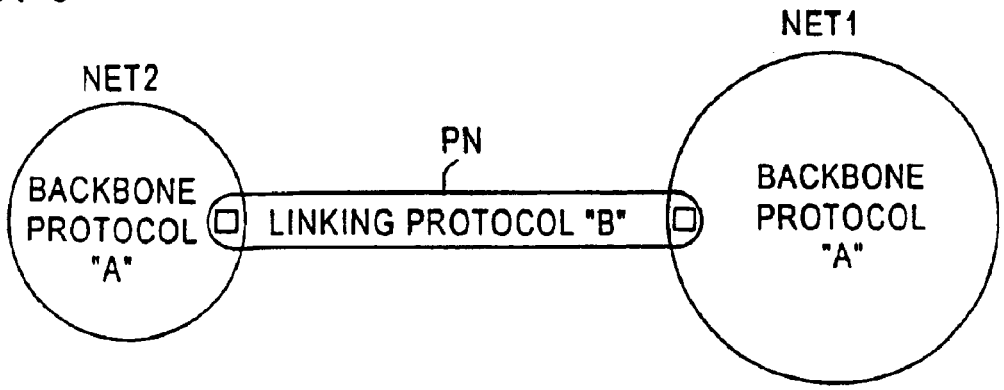
FIG. 5 is an illustration of the difference in protocols between that of the internal and external networks, and that of the primitive network.

FIG. 5 shows network NET1 connected to network NET2 over a primitive network. The primitive network shown in FIG. 5 is essentially a generic representation of several types of primitive networks which might be utilized to connect the two networks to provide security isolation as desired in accordance with the invention. In its simplest form, the primitive network PN between NET1 and NET2 can be a simple wire connection over which the data flows once it has been removed from the TCP/IP envelopes which encapsulated it during its traversal of NET1 or NET2. Weaknesses in the TCP/IP protocol code that might ordinarily be exploitable by a hacker are not available once data (removed from its encapsulation) reaches the primitive network.

Figure 6:
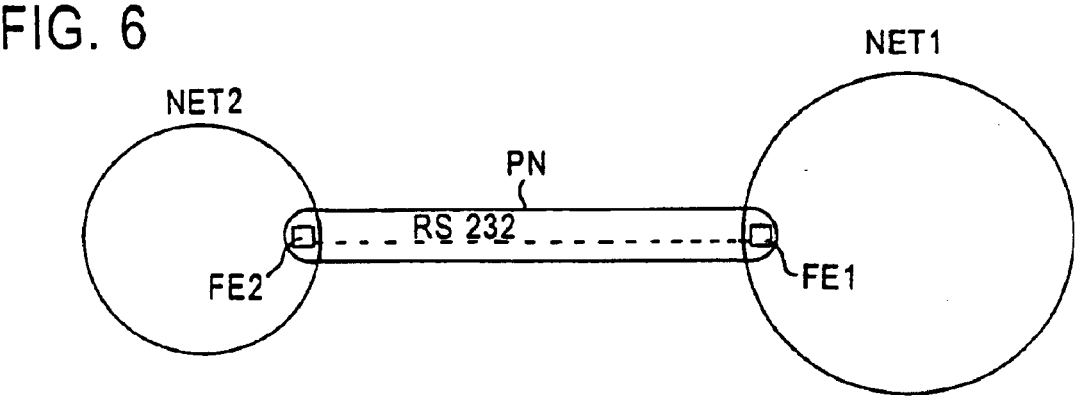
FIG. 6 is an illustration of a primitive network based on RS232 protocol.

FIG. 6 illustrates another example of a primitive network connecting NET1 and NET2. In this embodiment, the primitive network is comprised of an RS232 link between the front ends of NET1 and NET2. The RS232 link has the ability, like a direct connection, to pass data that has been extracted from the TCP/IP encapsulation. The simplicity of the RS232 specification does not permit weaknesses in the TCP/IP protocol in NET1 that might be exploited by a hacker to propagate across the RS232 link into NET2.

Figure 7:
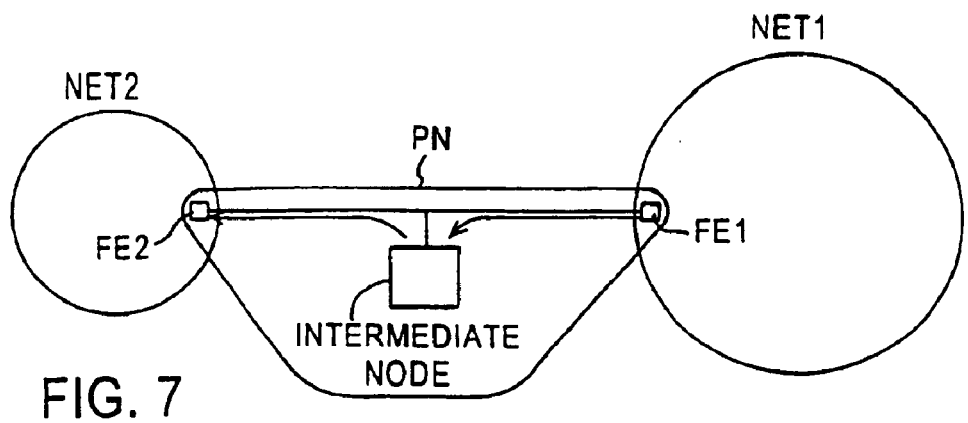
FIG. 7 is an illustration of a primitive network including an intermediate node.

FIG. 7 is an exemplary embodiment in which the primitive network includes an intermediate node. This intermediate node can take several forms.

Figure 8:
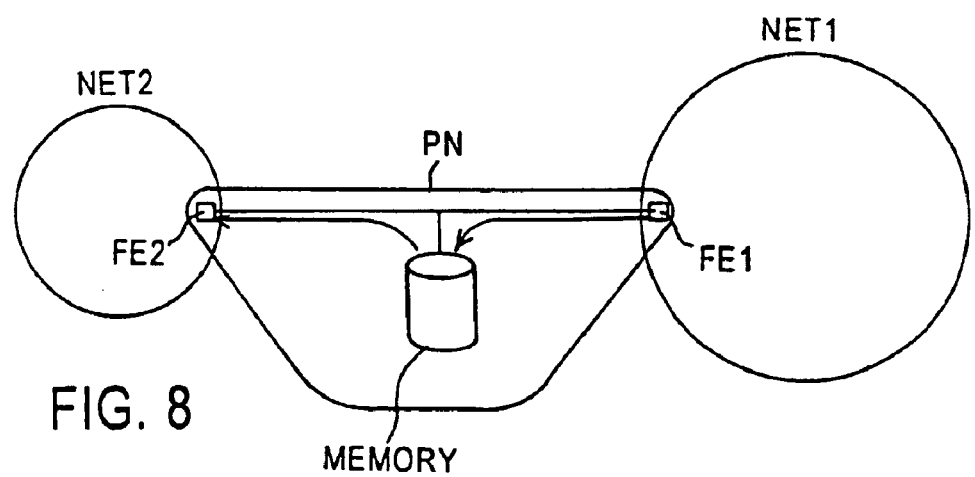
FIG. 8 is an illustration of the intermediate node of FIG. 7 as a memory medium.

In the embodiment shown in FIG. 8, the intermediate node is a memory medium. In this embodiment, data coming from NET1 is written to the memory medium and then subsequently read by the front end connected to NET2. This approach permits not only the isolation provided by the primitive network PN, but isolation in time as well.

Figure 9:
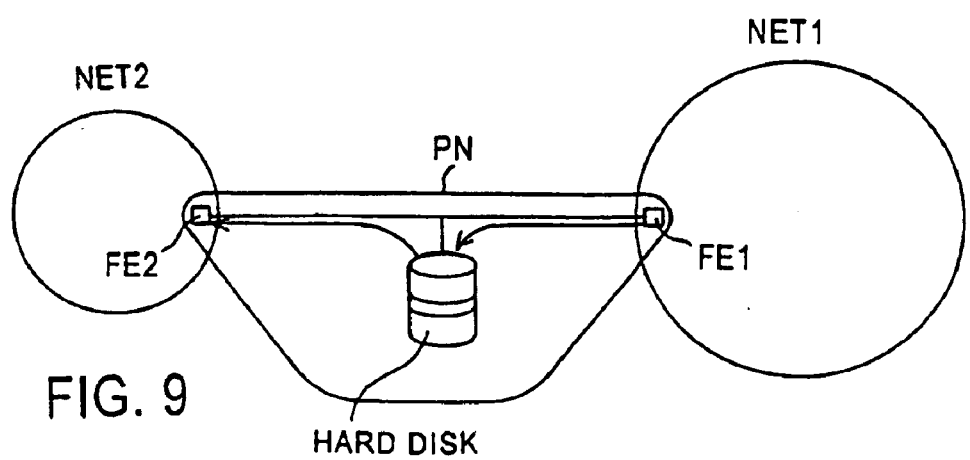
FIG. 9 is an illustration of the intermediate node of FIG. 7 as a magnetic storage medium.

If, as illustrated in FIG. 9, the memory medium at the intermediate node of the primitive network takes the form of a magnetic storage medium, such as a hard drive, the performance of the disk can be improved if writing to and reading from the disk occurs to/from a single sector. In this arrangement, the latency associated with seeking a track and moving a read or write head over the track to which the data has been written is obviated. Rather, the read/write head(s) remains in one position and the reading and writing operations occur to a single track or sector consecutively.

To achieve even better performance, the read/write blocks can be adjusted to correspond to cache size so no reading and writing to the magnetic media need occur. This will increase the lifetime of the storage device, since it will decrease the movements of parts in the device. As an alternative, an electronic memory storage device can be used with no moving parts.

Figure 10:
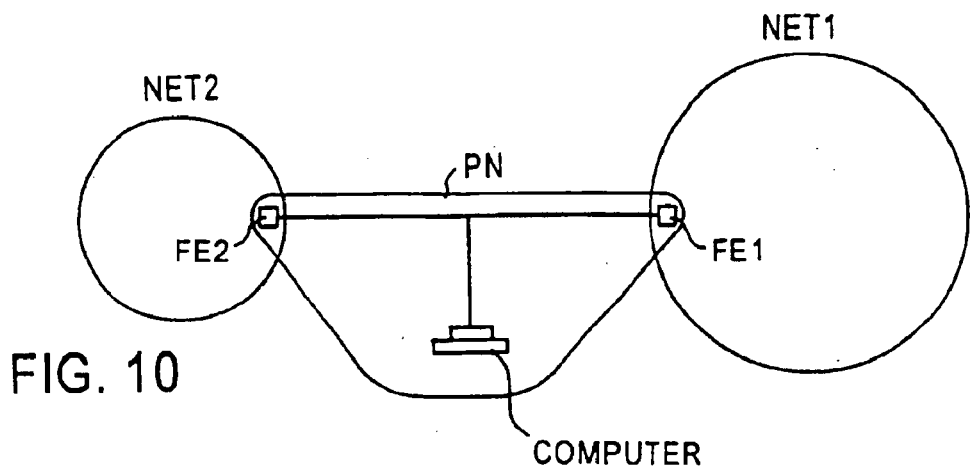
FIG. 10 is an illustration of the intermediate node of FIG. 7 as a computer.

As shown in FIG. 10, the intermediate node of a primitive network can be a computer itself. In this case, the front end of NET1 loads the information from the front end into the intermediate node computer where it may be stored until it is sent to the front end of NET2 or retrieved by the front end of NET2 upon request.

Figure 11:
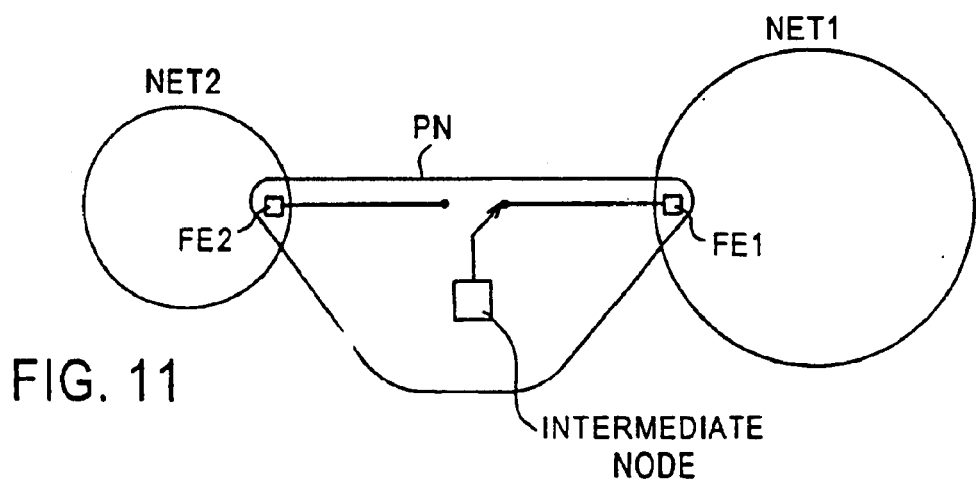
FIG. 11 is an illustration of the intermediate node of FIG. 7 as a switchable device.

In FIG. 11, the intermediate node on the primitive network is shown generically as a switchable device which can be connected selectively to the front end of NET1 and to the front end of NET2. This keeps the two networks electronically disconnected at all times and ensures that the internal network FE is communicating with a trusted destination (the intermediate node) at all times without the interference of the external FE, an untrusted node.

Figure 11A:
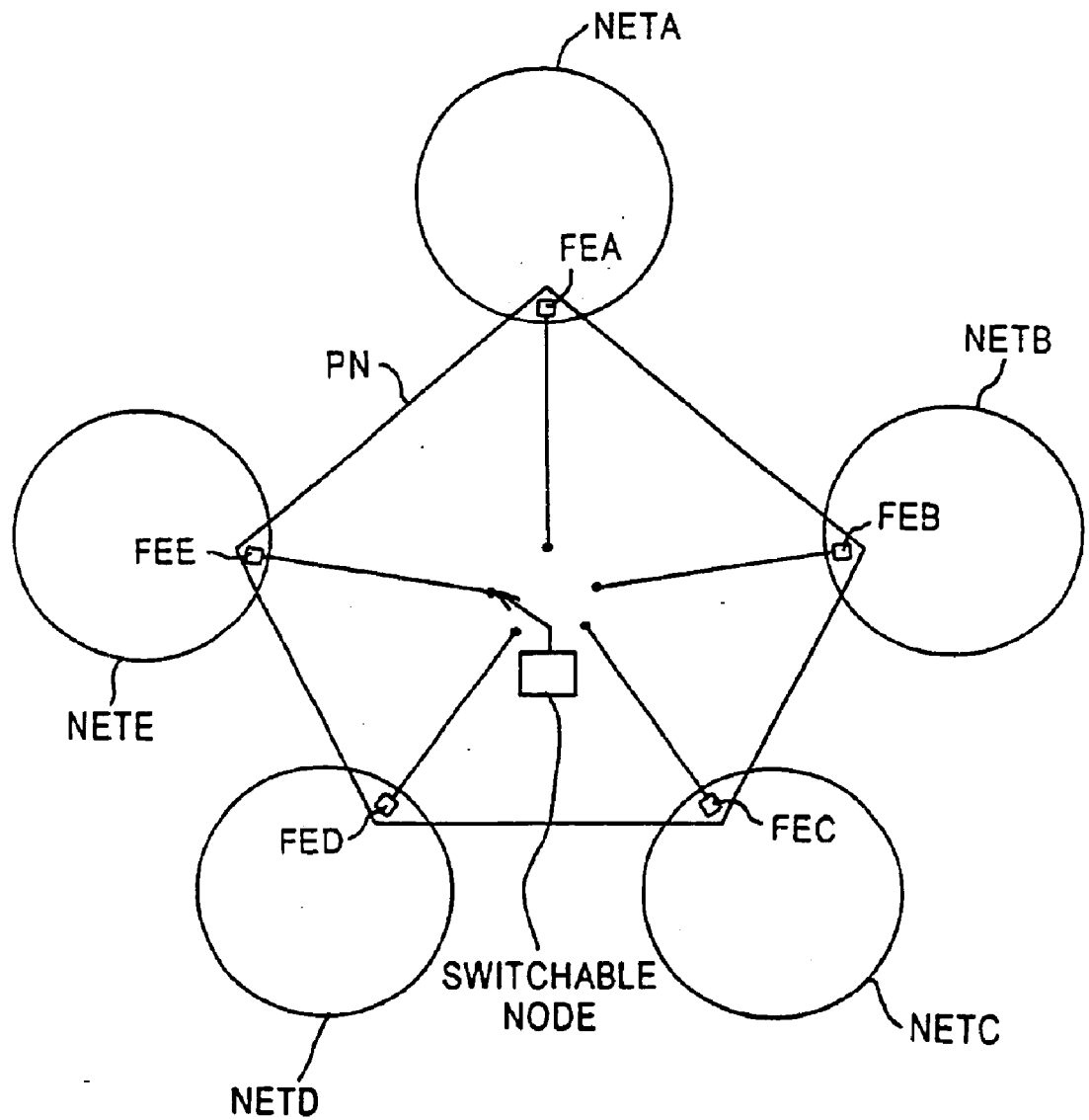
FIG. 11A is an illustration of a plurality of networks connected together with a primitive network have a switchable intermediate node.

FIG. 11A illustrates a plurality of networks (NETA, NETB, NETC, NETD, NETE) connected using a primitive network PN which has a switchable intermediate node (e.g., a storage device). In this illustration, front end FEE of NETE is connected to the switchable intermediate node while being disconnected from all the remaining front ends (FEA, FEB, FEC, FED). Subsequently, the front end FEE of the NETE will disconnect from the switchable intermediate node and another of the front ends will connect to the switchable intermediate node while being disconnected from the other front ends. Thus, one a single front end (of network NETA, NETB, NETC, NETD, NETE) at a time is connected to the switchable intermediate node.

Figure 12A:
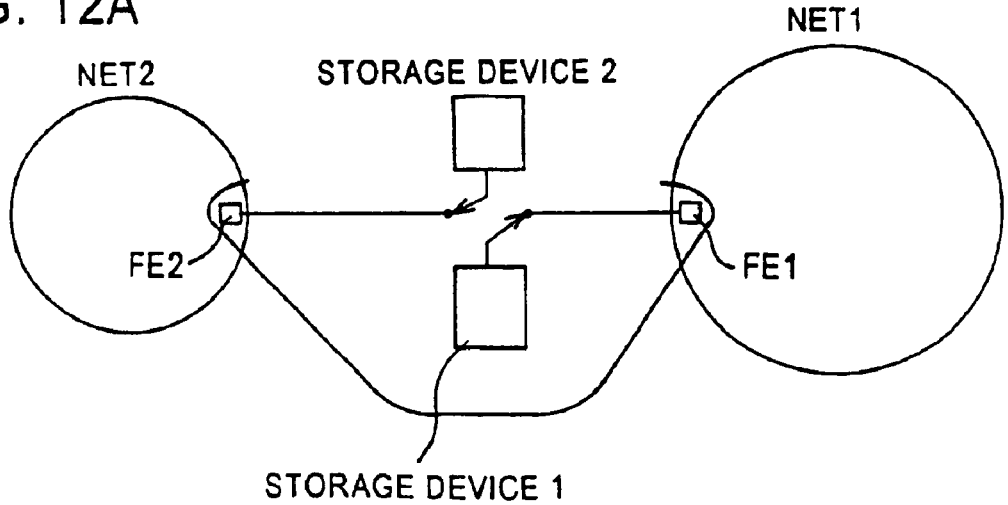
FIG. 12A is an illustration of the switchable device of FIG. 11 as two-switched storage devices
Figure 12:
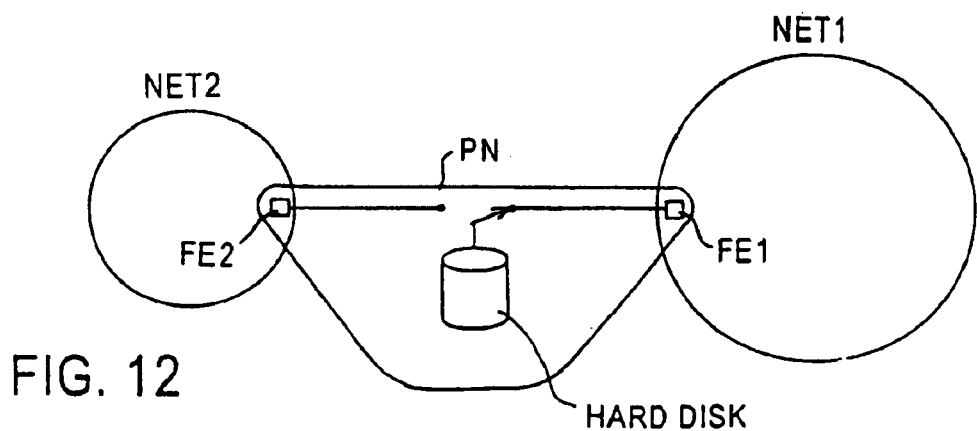
FIG. 12 is an illustration of the switchable device of FIG. 11 as a disk drive.

In FIG. 12, the switchable device is a disk drive. When connected to the front end of NET1., information can be transferred from the front end to the disk and from the disk to the front end. When connected to the front end of NET2, information stored on the disk can be read by the front end of NET2 and information from NET2 can be written to the disk. All transfers to and from disks can be done, preferably, using direct memory access (DMA).

FIG. 12A shows the switchable device as two-switched storage devices. When connected as shown in the FIG. 12, FE1 reads and writes information to storage device 1 while FE2 reads and writes information to storage device 2. Then the connection is toggled so that FE1 is connected to storage device 2 and FE2 is connected to storage device 1 so that each can read the others (written) data and then write new data.

Figure 13:
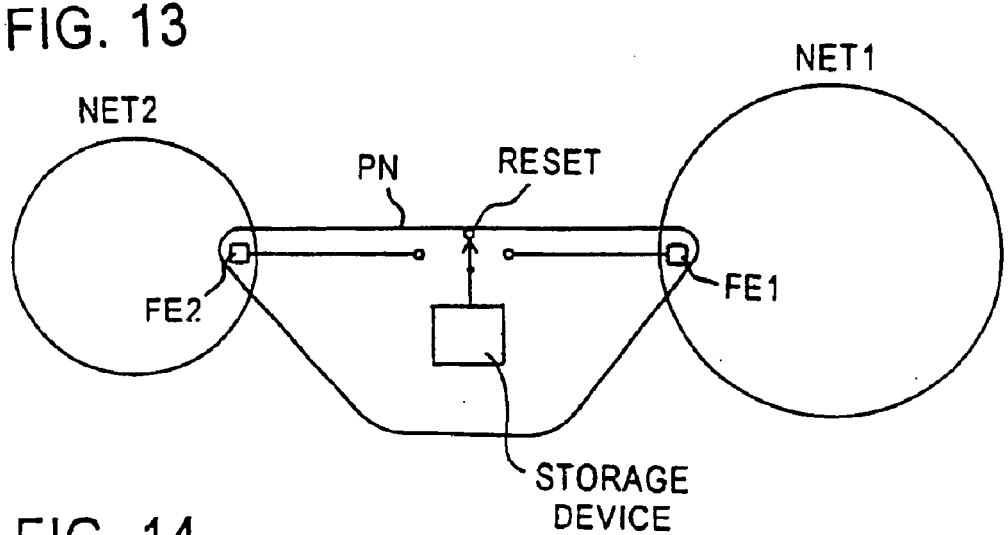
FIG. 13 is an illustration of the intermediate node of FIG. 7 as a switchable storage device with additional security features.

FIG. 13 shows an extension of the concept shown in FIG. 12 with additional security features. The storage device shown in FIG. 13 operates under control of a controller; e.g., a hard disk with a hard disk controller. The hard disk controller has the ability to be selectively reset. When the disk controller is reset, it resets to a default state that has been predetermined either by the controller manufacturer or by an original equipment manufacturer (OEM) that incorporates the disk into the system. The reset position shown in FIG. 13 symbolically represents the fact that between the two states utilized to connect the disk to the front end of NET1 and to the front end of NET2, respectively, there is a resetting of the hard disk controller. This resetting does not affect any of the information stored in memory. When the front end of NET1 writes information to the hard disk and receives information from the hard disk, the hard disk is connected to the front end of NET1 and disconnected from the front end of NET2. The hard disk connection is then switched to the front end of NET2 so the information can be transferred between the front end of NET2 and the hard disk. To avoid any possibility of a hacker on NET1 or NET2 from reaching out and taking control of the controller of the hard drive, the controller is reset with each change of state of the switch. In this way, even if a hacker should achieve control of the controller of the hard drive, any settings that were deliberately corrupted by the hacker would be erased when the controller was reset. Thus, one can guarantee that the controller is always in the correct state, regardless of attempts from the outside to maliciously interfere with its operation and that the security would thus be maintained. This approach can be applied to any node used as the intermediate node and not just to a hard disk. One can reset all of the hardware as long as the contents of memory are not reset. This resetting ensures that the intermediate node conforms to the PN protocol.

In FIGS. 11–13, there is no instant of time during which there is a physical or electronic connection between NET1 and NET2. One way of demonstrating how this is accomplished is discussed hereinafter. However, it can be accomplished simply by ensuring that the connection to one side of the switch is broken before the connection to next side of the switch is made.

Figure 14:
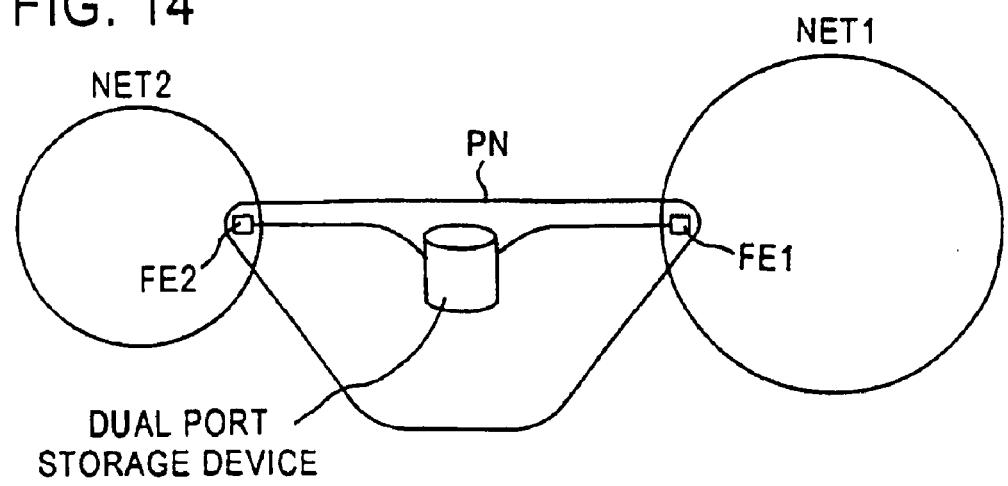
FIG. 14 is an illustration of the intermediate node of FIG. 7 as a dual port storage device.

In FIG. 14, however, although the line illustrates a connection to a dual storage device (e.g., a hard disk) from both front ends, the signal path between the front end of NET1 and the front end of NET2 is such that the signal path is never electrically continuous between the front end of NET1 and the front end of NET2. Rather, in this illustration, the data from the signal path from the front end of NET1 is written onto the hard disk of the primitive network and then, at a point displaced in time, read from the magnetic medium by the front end of network NET. This displacement in time and the physical separation of the read/write heads from the magnetic medium (of the hard disk) ensures that no electrical connection is achieved, in the signal path between the front end of NET1 and the front end of NET2.

When data arrives at the internal front end, the internal front end can inspect the information passed to it and decide whether to pass the information, as it is, modify it, or block it completely. If no clear decision can be made automatically, the information can be routed to a security officer console for a manual decision. Some of the checks that can be made at the internal front-end machine (or on other delegate nodes) include virus detection & digital signature authentication (both on inbound communications), and key word search (on outbound communications). Examples of modifications that can occur to data include the following: encryption and digital signing of outgoing transmissions, decryption of incoming transmissions, application level processing and format conversion.

Although technologies to filter the content exist, an important advantage of the described invention in one embodiment is the fact that all filtering is performed in the internal (secured) front end, and hence, cannot be overridden, even if the external front end is taken over by a hacker. In addition, all cryptographic keys are safely stored on the inside (secured) network and are not exposed to the outside. These keys cannot be retrieved even if a hacker took control over the external front end.

Figure 15:
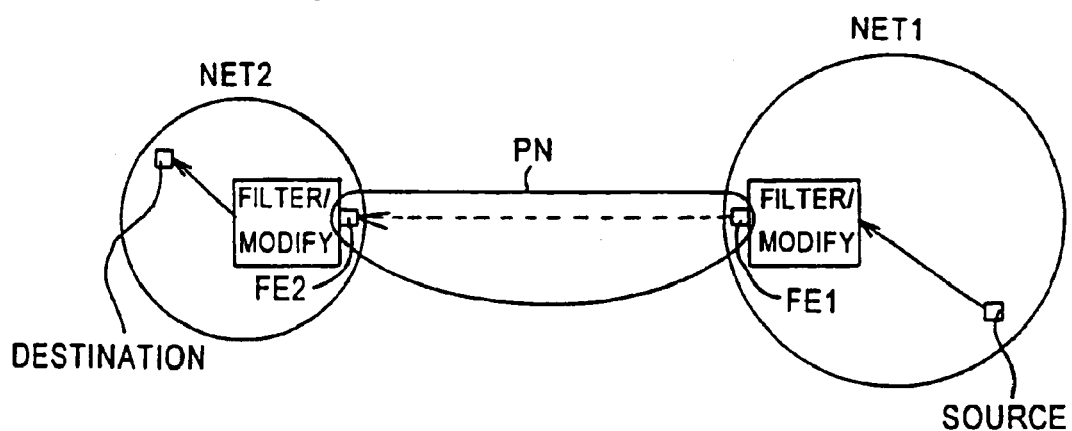
FIG. 15 is an illustration of filtering/modifying data at front ends of the primitive network.

FIG. 15 illustrates the concept that data filtering and modification can occur at both front ends FE1 and FE2. For example, the incoming data can be tested for viruses and/or can be decrypted at FE2. However, since NET1 is sometimes the internal network and NET2 is the external network, data to be transferred outbound (from NET1 to NET2) may be filtered or modified at the internal FE; e.g., encryption, key word detection, etc. Hence, both FE1 and FE2 may filter and modify the communication. Delegate nodes on behalf of the FE nodes may carry out the filtering (and modification) process. However, the delegate nodes reside on the same network as the FE (i.e., NET1 for FE1 and NET2 for FE2).

Figure 16:
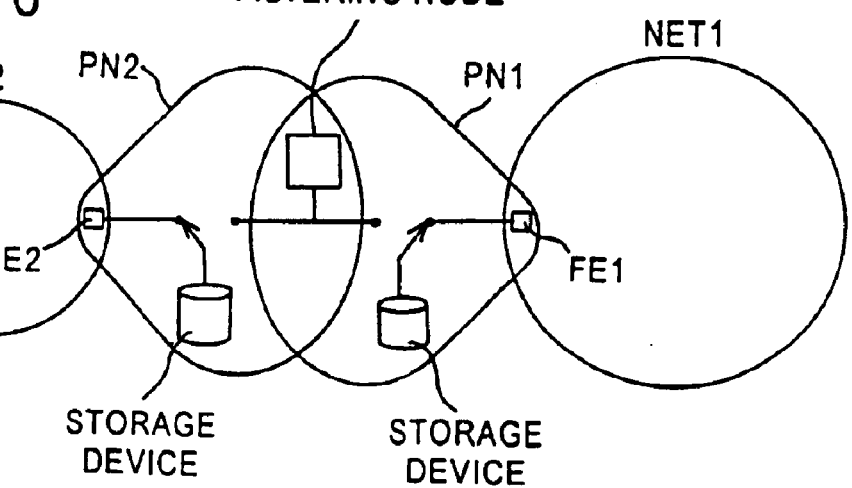
FIG. 16 is an illustration of using two primitive networks to connect the internal network and external network.

FIG. 16 shows a network architecture in which two primitive networks (PN1, PN2) are utilized to achieve additional security between NET1 and NET2. In many of the examples described previously, NET2 is assumed to be secure whereas NET1, typically the Internet, is definitely not secure. However, it is not uncommonly the case that NET2 can be unsecure as well. In such a circumstance, it may be desirable to protect the internal network from users on both networks. One way of doing that is shown in the architecture of FIG. 16. The front end of NET1 connects to an intermediate node over PN1. The intermediate node then can perform all security processing on the information flows, including inspection and modifications. The information flow from the intermediate node can then pass to NET2 over PN2. In this fashion, the intermediate node that filters the data is protected from both networks and not even a hacker residing in the internal network (NET2) can override the security filtering performed on that node.

Figure 17:
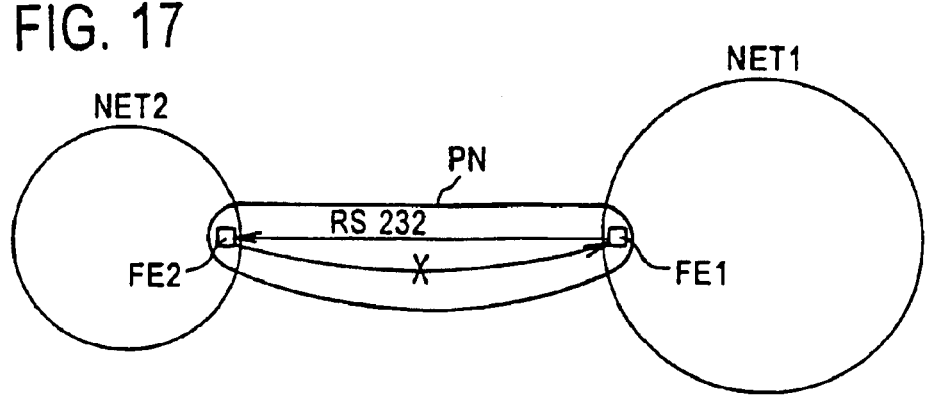
FIG. 17 is an illustration of a primitive network having one way data flow.

It is sometimes the case that one desires to ensure the data flows only in one direction. Such a situation might occur when data is to be broadcast in only one direction from one network and that no interaction with the other network to which the information is being broadcast should occur. FIG. 17 shows one way of achieving this. In FIG. 17, the RS232 link is partitioned so that data flows only in one direction. Specifically, the link in the opposite direction is disabled either by not equipping the RS232 connector with wiring or by throwing a switch.

Figure 18:
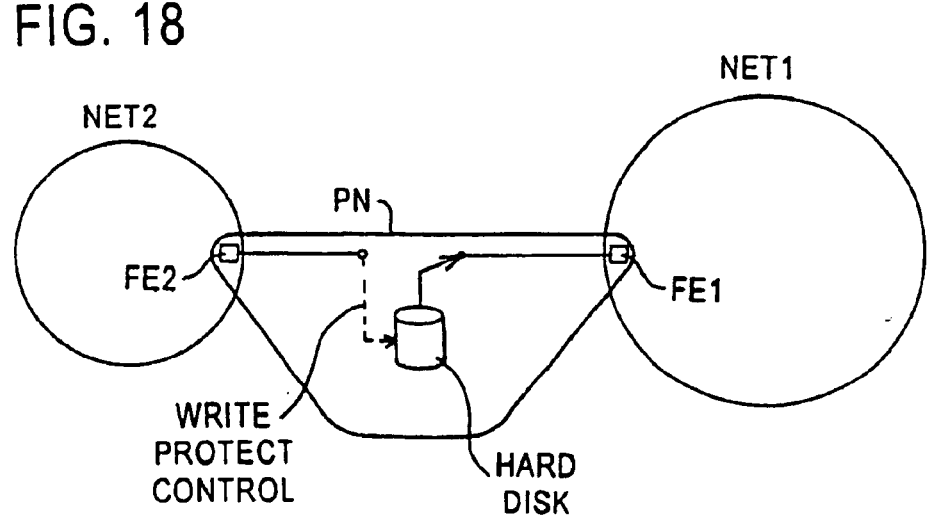
FIG. 18 is another illustration of a primitive network having one way data flow.

A different implementation is shown in FIG. 18 with the storage device being, for example, a hard disk. In FIG. 18, one directional flow of information is achieved by imposing a write protect mode on the hard disk when the switch changes from connecting from one front end to connecting to the other front end. As shown in FIG. 17, when the hard disk (storage device) is connected to the front end of NET2, a write protect line is activated so that the information from the front end of NET2 cannot be written to the hard disk. Information can only be written to the hard disk from the front end of NET1 and thus information can flow only in the direction from NET1 to NET2 (in the example where NET2 is the internal network this configuration assures no leakage of information whatsoever from the (highly confidential) internal network). For increased security, the default mode of the storage device is the read only mode and changes to a read/write mode only in response to a control signal.

Figure 19:
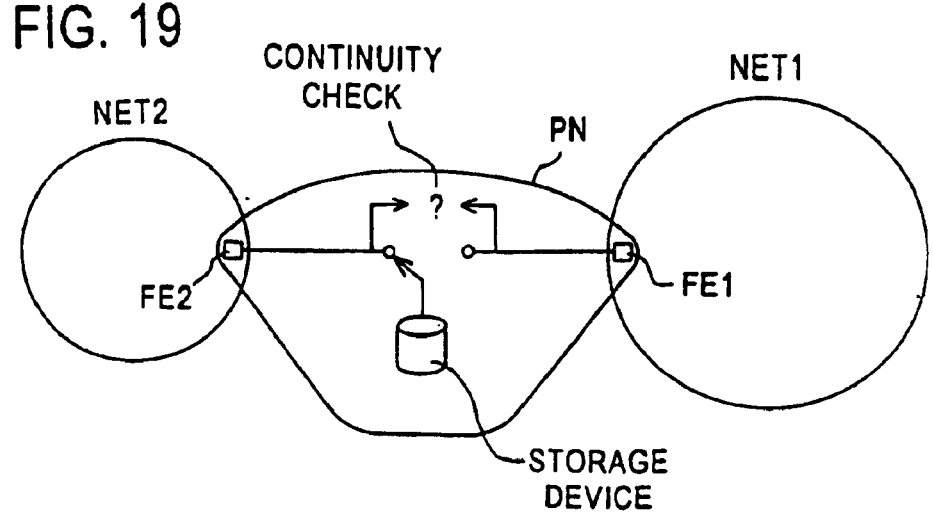
FIG. 19 is an illustration of checking for continuity for the switchable device of FIG. 11.

FIG. 19 illustrates the concept of assuring that no electrical connection (electrical isolation) is achieved in the signal path between the front end of NET1 and the front end of NET2 by checking for continuity (i.e. a short circuit) across the input and output of the switched device.

Figure 20:
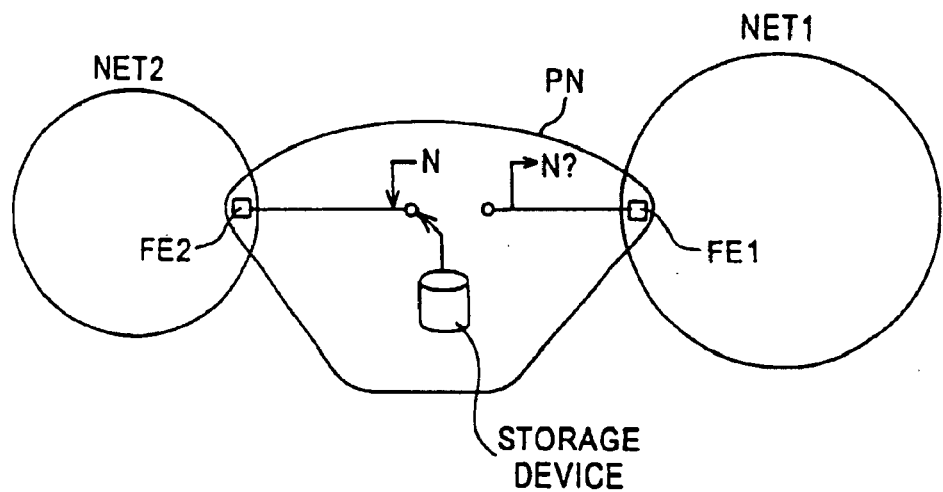
FIG. 20 is another illustration of checking for continuity for the switchable device of FIG. 11.

FIG. 20 illustrates a sample implementation of checking for continuity across the switched path. In particular, a periodic wave (e.g. a sine wave) is injected on all signal wires on one side of the bus connection and the other side of the bus connection determines whether or not the injected periodic wave is present on any of its signal wires. Presence of the wave indicates continuity across the switched path.

Figure 21:
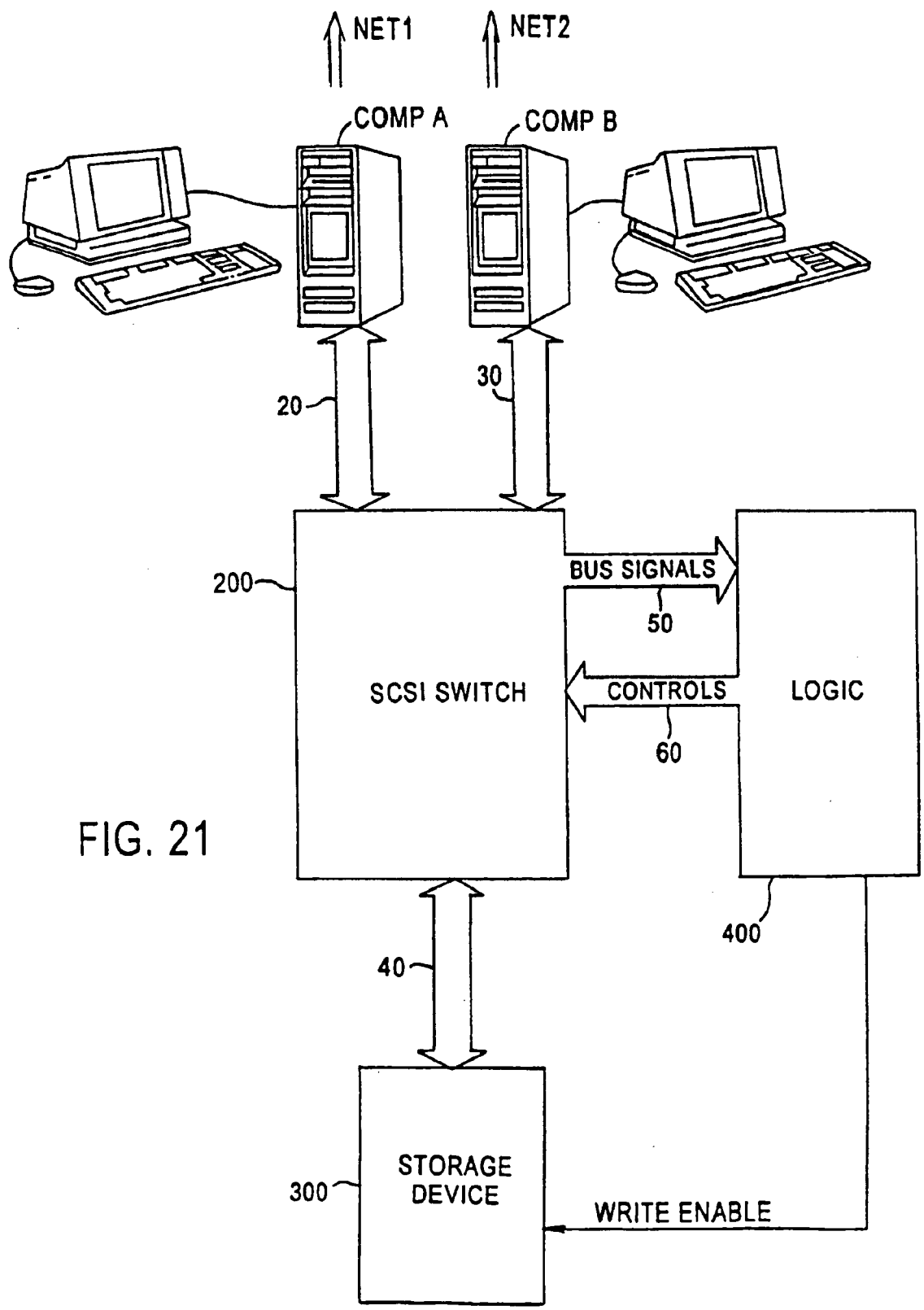
FIG. 21 is a block diagram illustrating an implementation of the present invention as a switchable storage device.

FIG. 21 is a block diagram illustrating an implementation of the present invention, and includes two computers (COMP A and COMP B) acting as front ends for two networks, and a switchable storage device. Computer A is connected to a SCSI switch 200 via SCSI bus 20 and computer B is connected to switch 200 via SCSI bus 30. The bus signals from both SCSI buses 20 and 30 are provided as bus signals 50 to logic 400, which provides controls 60 to switch 200. Switch 200 is connected also to storage device 300 which can be, for example, a magnetic disk or an electronic memory device, via another SCSI bus 40. In the present description, switch 200 is implemented as an analog switching device (described later) connecting storage device 300 to either SCSI bus 30 or SCSI bus 20. However, other implementations of switch 200 are possible. Signals to control the toggling of switch 200 originate in the driver that resides in the computer which is currently connected to the storage device 300 and can be in one preferred embodiment, an indication by each computer that it is finished accessing the disk. This indication is provided to logic 400 which issues controls 60 directing the switch 200 to toggle connection to the storage device from one SCSI bus to the other SCSI bus. The signal sent by a front end can be, in another embodiment, a command to write to a non-existent device.

Logic 400 provides also a write enable signal to storage device 300 enabling the option of placing storage device 300 in either read/write mode or read-only mode. A user of the invention can select these modes. For example, the mode of storage device 300 can be selected to be the read-only mode when connected to Computer A and to be the read/write mode whenever switch 200 connects Computer B thereto. Consequently, no data can flow from the network represented by Computer A to the network represented by Computer B through the primitive network. As noted earlier, for security purposes, the default mode of storage device 300 is the read-only mode. This ensures the logic 400 has indeed allowed for the relevant FE to pass data.

If storage device 300 is, for example, set to read-only mode (unidirectional mode) when connected to computer A, no acknowledgement can be written to the storage device indicating that data has been successfully read and processed.

Figure 22A:
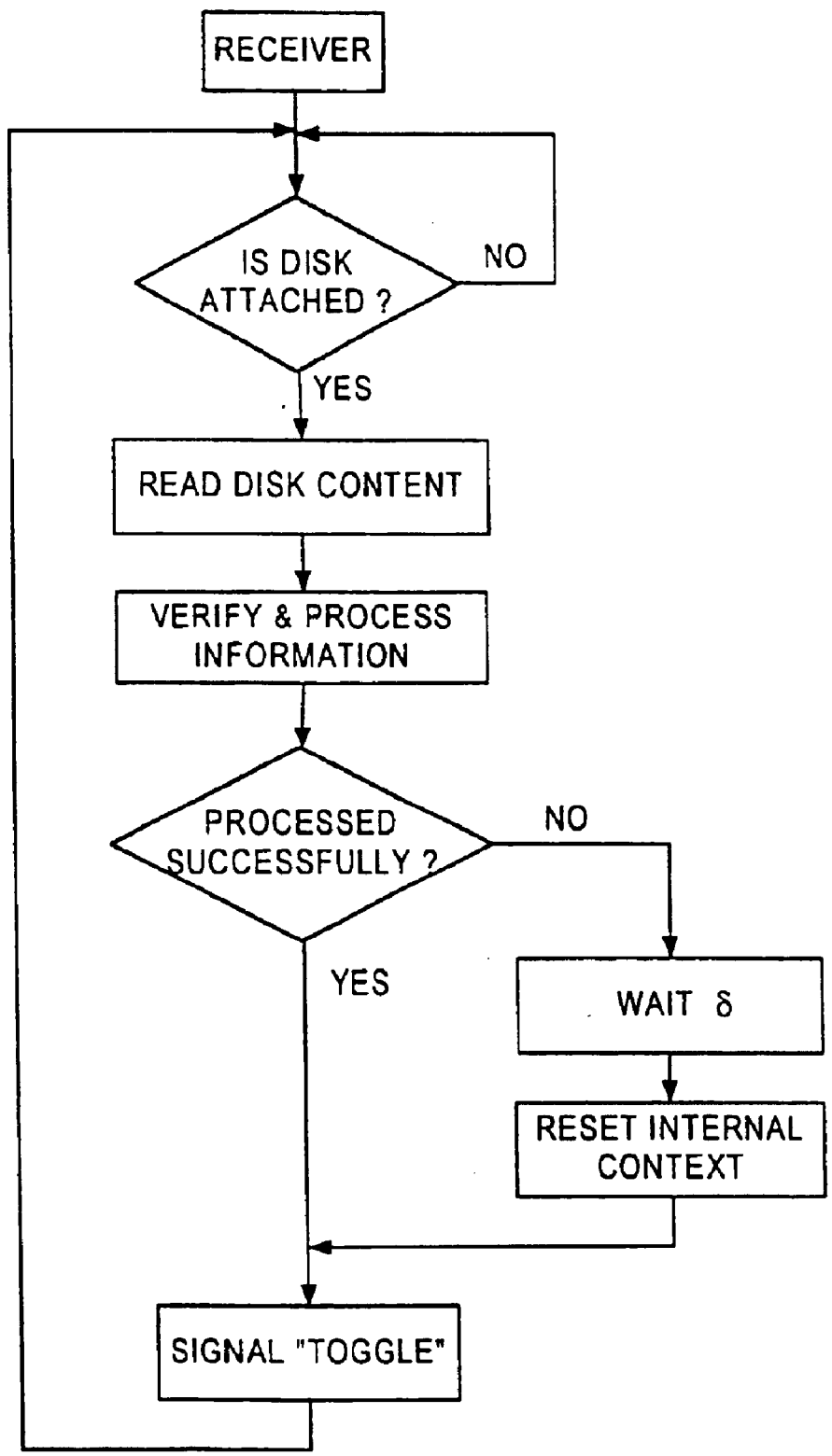
FIGS. 22A and 22B are flow diagrams illustrating operation of a receiver driver and a sender driver in the unidirectional mode.
Figure 22B:
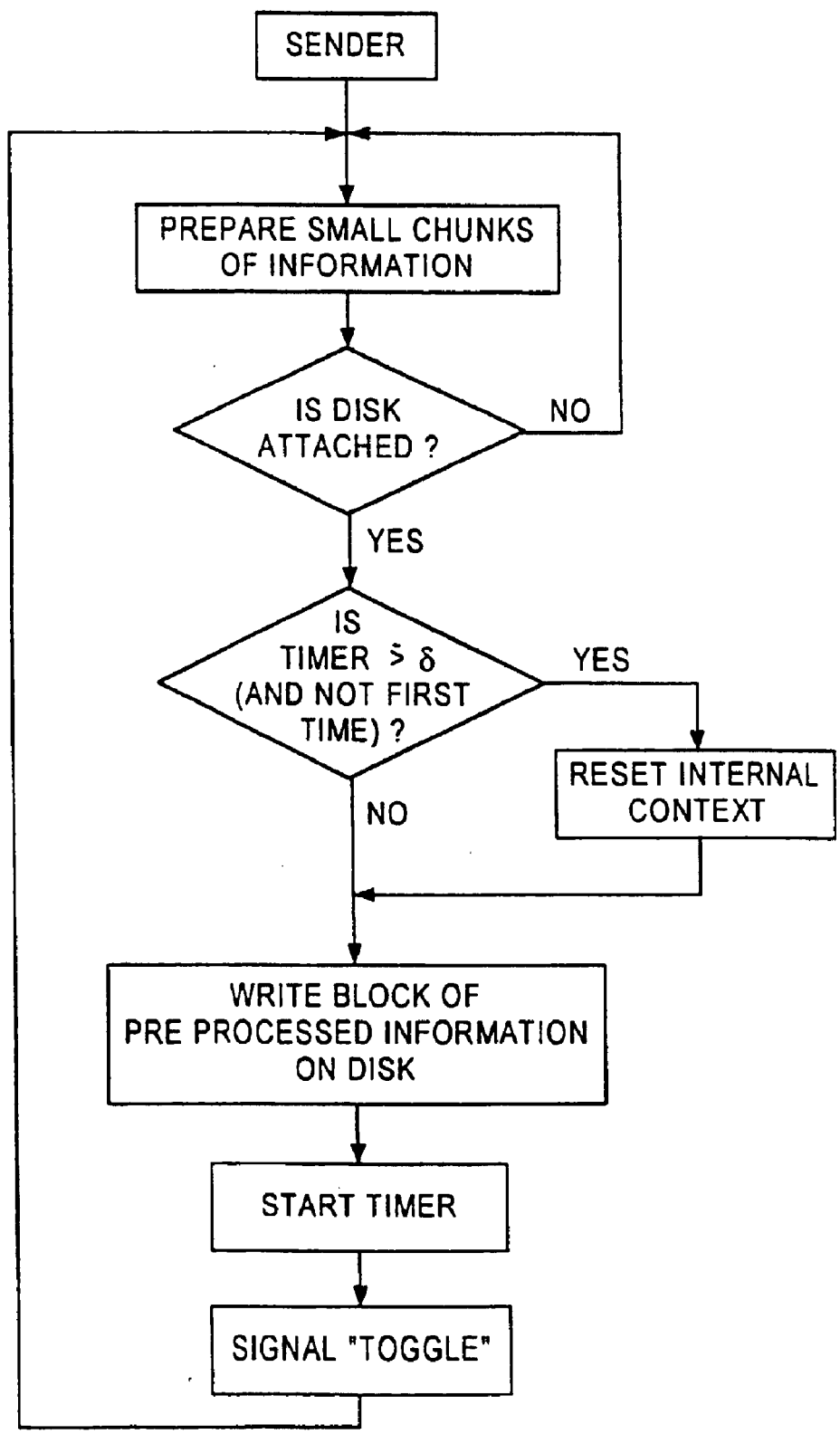

FIGS. 22A and 22B are flow diagrams illustrating operation of a receiver driver and a sender driver in the read-only mode (unidirectional mode) for addressing this problem. Referring to FIG. 22A, a receiver (of the data) first determines whether the storage device 300 is attached and if not, waits until it is. When the storage device 300 is attached, the contents of the storage device are read and verified. Next, the content is processed (possibly by forwarding it to its ultimate destination for processing). If processing is successfully finished, a "toggle" signal is sent indicating that switch 200 should change connection. If the data has not been successfully processed, then a delay of δ seconds or fractions of a second is initiated (the storage device is held in one position), the internal context is reset and then the "toggle" signal is sent (after the delay). The delay is interpreted as a negative acknowledgement by the sender.

Referring to FIG. 22B, a sender prepares a small chunk of information to be sent to the storage device and then queries whether or not the storage device 300 is attached. When the answer is NO, preparation of information continues until the storage device 300 is attached. When the storage device is attached (YES) a query is made as to whether time from a timer is $\geq \delta$ (the delay in FIG. 22A) and not the first time (the timer has been activated). If the response is NO, a block of preprocessed information is written to the storage device, the timer is started and the "toggle" signal is issued. However, if the response is YES, then the internal context is reset (meaning the next block that will be sent will represent the beginning of the transmission), a block of data is written to the storage device, the timer is restarted and the "toggle" signal initiated. Thus, if the receiver holds the storage device 300 for the delay (δ seconds), the sender will determine that the timer time is greater that δ which indicates that the information should be resent. Delay δ should be chosen such to be much longer than a normal cycle time to avoid needless resets.

Figure 21A:
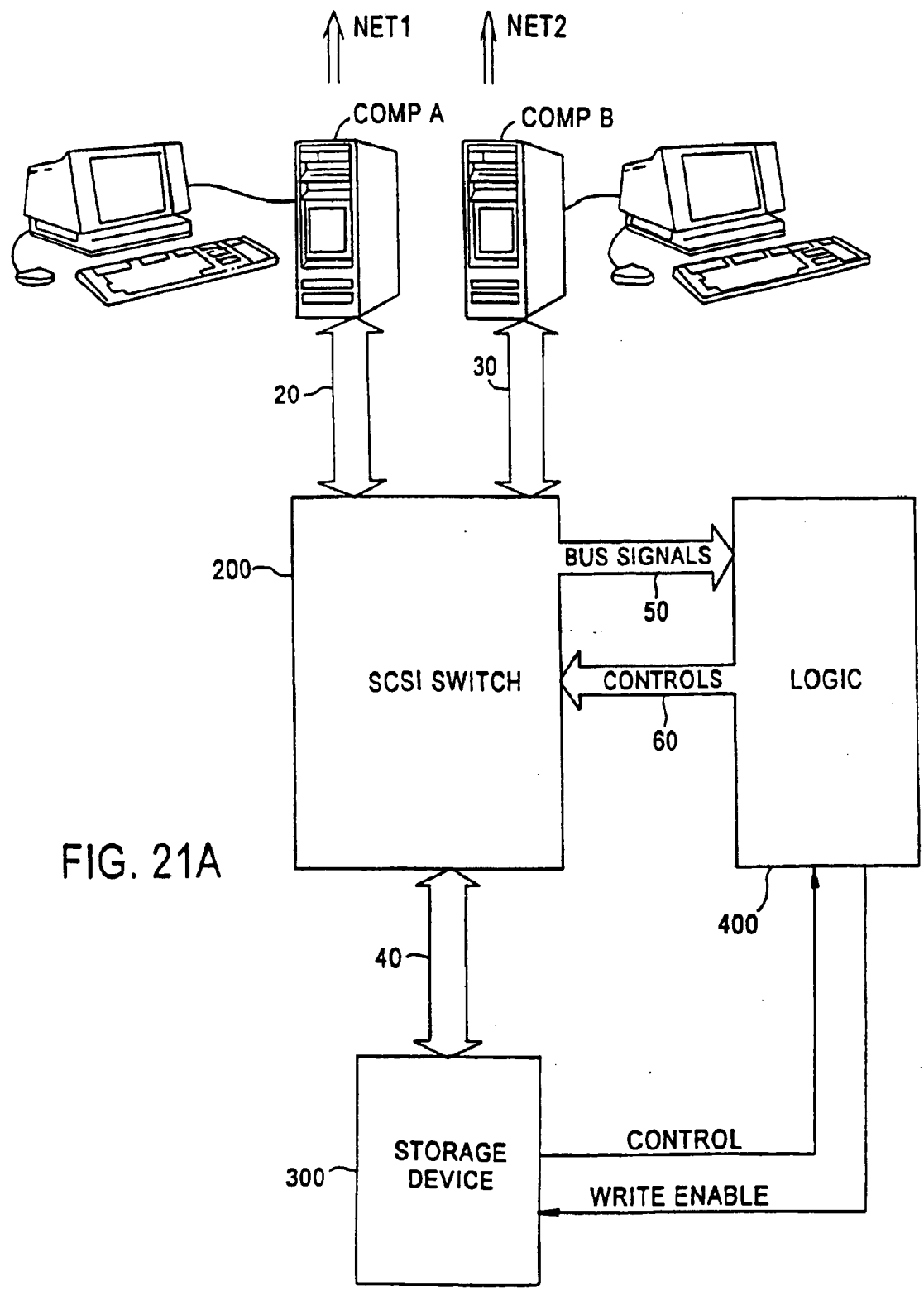
FIG. 21A is a block diagram illustrating a first variation of FIG. 21.

FIG. 21A shows a variation of FIG. 21 where a signal to release the storage device 300 is sent by special command from FE1 and FE2 to the storage device 300 via the switch connections of switch 200 and SCSI bus 40. The storage device 300 then issues a control signal to logic 400 which issues controls 60 directing the switch 200 to toggle connection from one SCSI bus to the other SCSI bus.

Figure 21B:
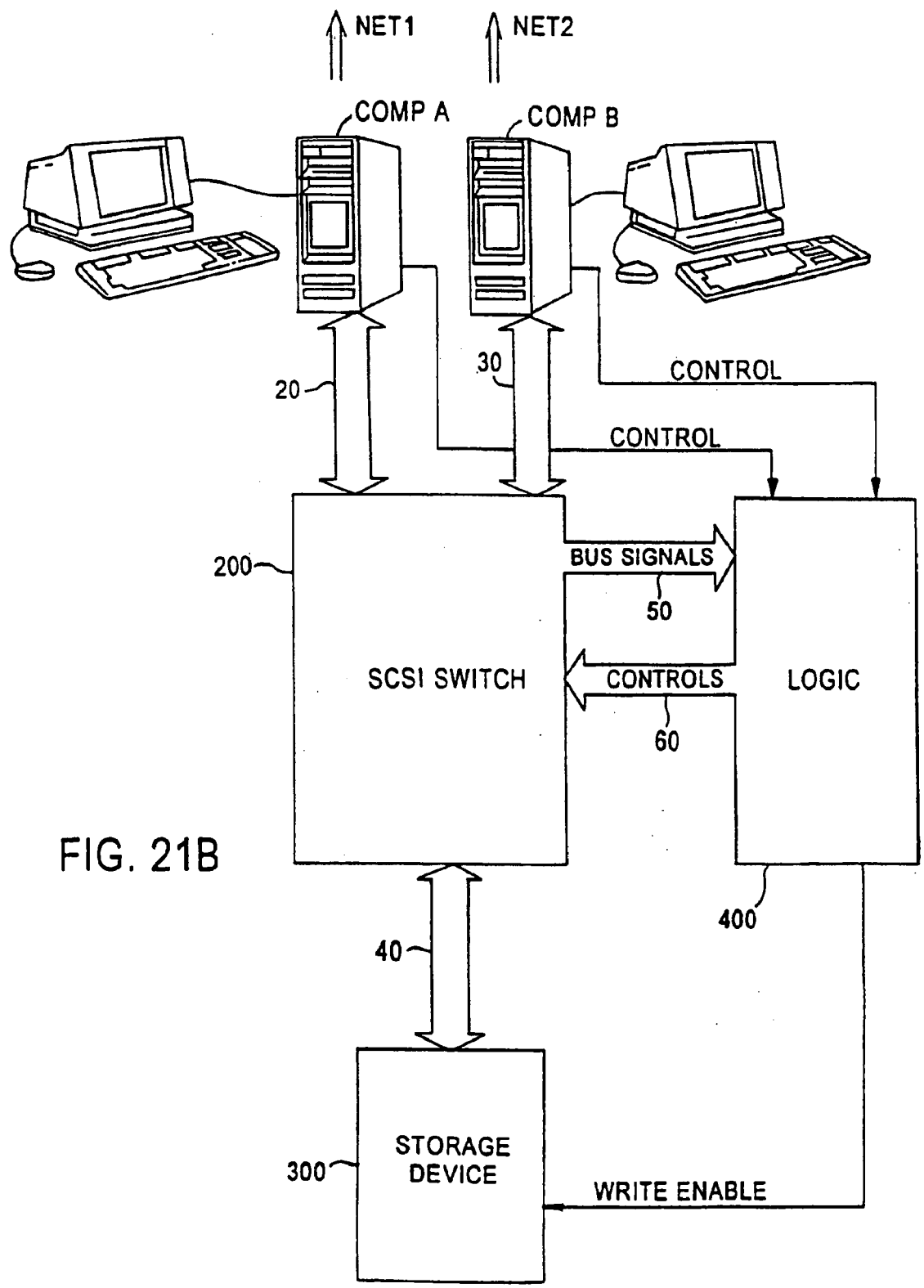
FIG. 21B is a block diagram illustrating a second variation of FIG. 21.

FIG. 21B shows still another variation of FIG. 21 where a signal to release the storage device 300 is sent from the front end directly to logic 400. Logic 400 then issues controls 60 directing the switch 200 to toggle connection from one SCSI bus to the other SCSI bus.

Figure 23:
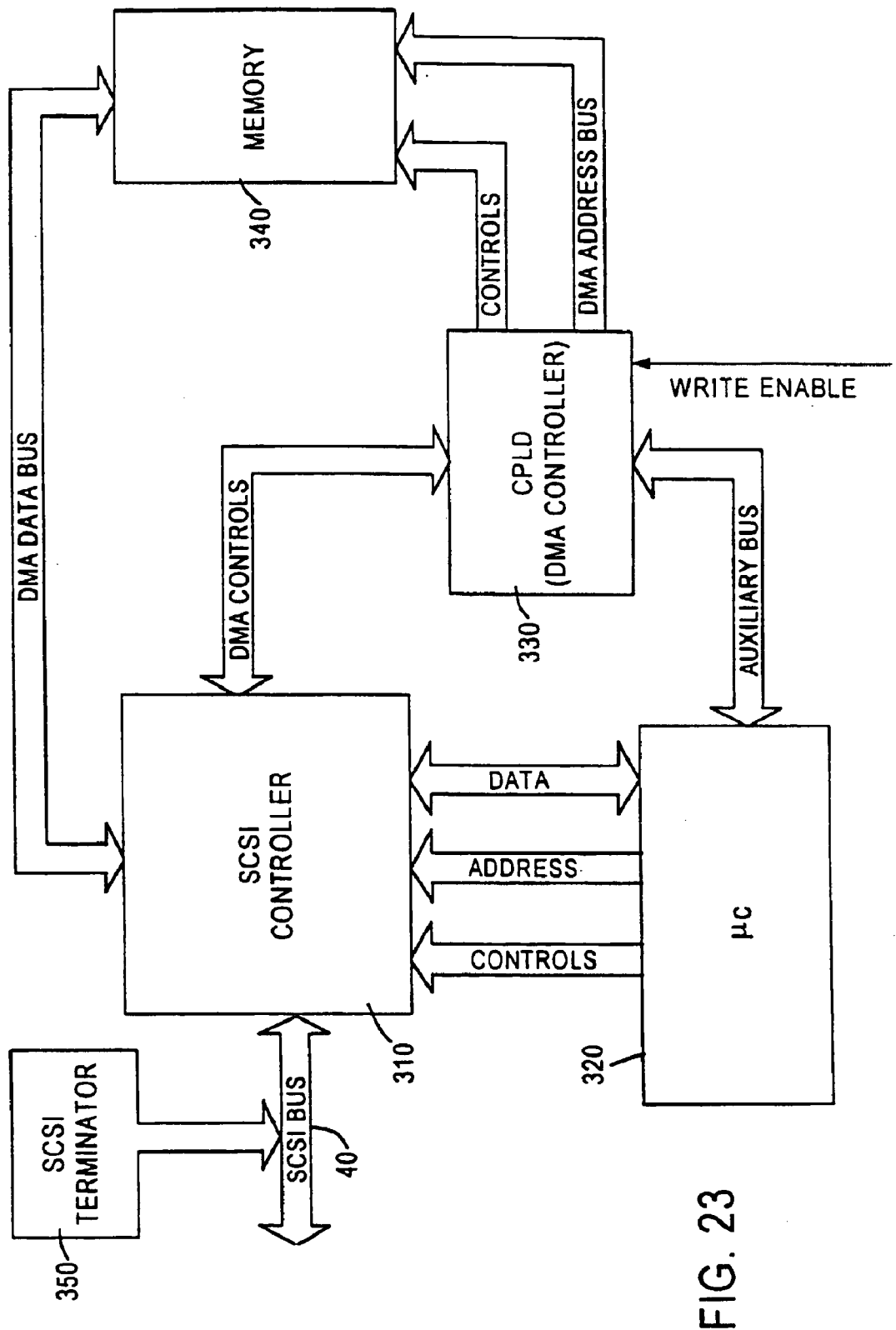
FIG. 23 is a block diagram illustrating an example of the storage device of FIG. 21.

FIG. 23 is a block diagram illustrating storage device 300 of FIG. 21. Data is received from SCSI bus 40 by controller 310. A SCSI terminator 350 ensures proper termination of the SCSI bus. Controller 310 is also connected to microprocessor 320, which provides control, address and data signals to the controller 310. An auxiliary bus connects the microprocessor to CPLD 330 (Complex Programmable Logic Device) which provides control signals and DMA (Direct Memory Access) addresses to memory 340. DMA control signals are also bidirectionally provided between controller 310 and CPLD 330. Data to be stored in the memory 340 are provided over the DMA Data Bus. The write enable signal from logic 400, which is used to place the memory 340 into the read/write mode or read-only mode, is provided to CPLD 330 and forms part of the control signals to memory 340. As noted earlier, the default mode of memory 340 is the read-only mode.

Figure 24:
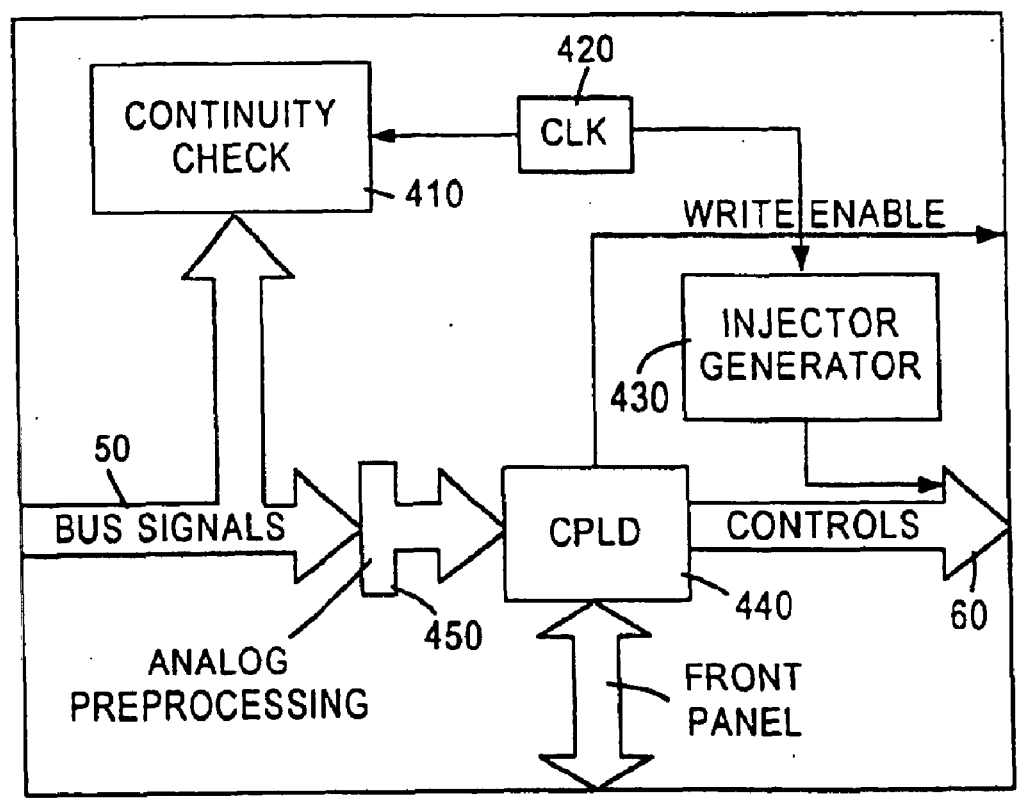
FIG. 24 is a block diagram illustrating an example of the logic circuit of FIG. 21.

FIG. 24, is a block diagram illustrating logic 400 of FIG. 21. Included in the logic 400 are Complex Programmable Logic Device (CPLD) 440, which is used to drive components on a front panel (not shown); e.g. LEDs, as well as to provide control signals 60 and the write enable signal. CPLD is used also to detect the attempted connection to the non-existence device mentioned earlier. Included also are an analog preprocessing circuit 450 to provide the necessary digital signals from the raw bus signals received on the bus 50, continuity check circuit 410, injector generator 430 and clock 420 to synchronize continuity check circuit 410 and injector generator 430. A signal from injector generator 430 is provided with control signals 60. Continuity check circuit 410 and injector generator 430 (described in more detail later) are used to check for continuity of the connection as mentioned earlier.

Figure 25:
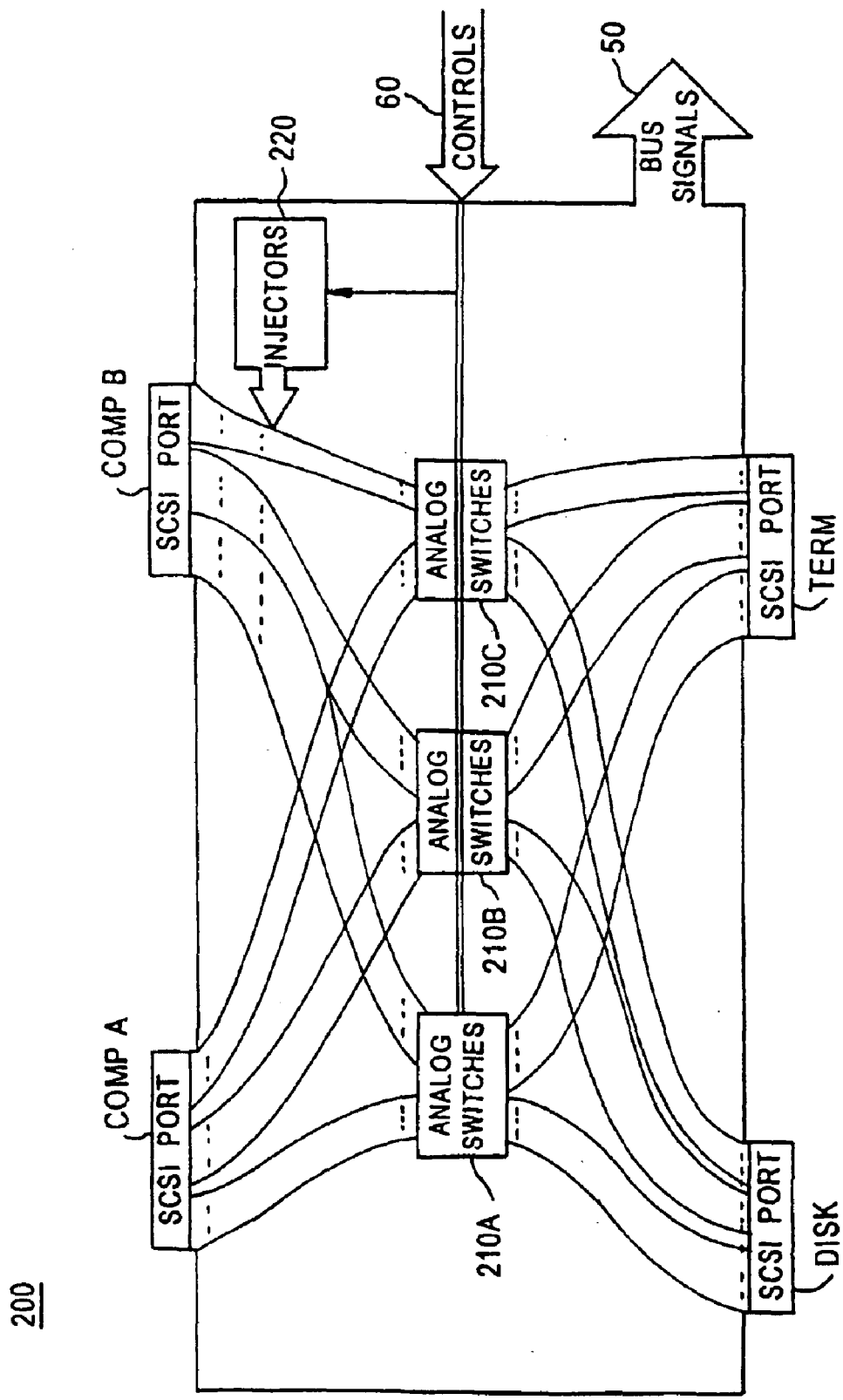
FIG. 25 is a block diagram illustrating an example of the switch of FIGS. 21, 21A and 21B.

FIG. 25 is an illustration of switch 200 of FIG. 21. The switch 200 has two SCSI ports on one side (one labeled COMP A and the other labeled COMP B) and two SCSI ports on the other side (one labeled TERM and the other labeled DISK). The switch 200 can connect either COMP A to DISK and COMP B to TERM, or connect COMP A to TERM and COMP B to DISK. In either case, this is transparent to both SCSI buses. In one implementation of the invention, DISK is connected to a terminated SCSI storage device, and TERM is connected to a SCSI terminator. For further performance, TERM can be connected to a second terminated SCSI storage device. In this manner, each FE has a storage device attached to itself at all time, while still disconnecting the front ends. Three identical chips 210A, 210B and 210C, each having 12 sets of analog switches, perform the actual switching in FIG. 25. While three chips are shown, it is possible to use a single analog chip or more than three chips. It is possible still to use some other type of switch that performs the necessary switching function (e.g. relay).

The signal provided from injector generator 430 is input to injectors 220, discussed more hereinafter, for injecting a signal to the lines from computer B. When this is the case, detectors (shown in FIGS. 26 and 27) are provided for the lines of computer A. While FIG. 25 shows injecting signals on the lines from computer B, this could be reversed and a signal could be injected to the lines from computer A with the detectors connected to the lines from computer B.

Figure 26:
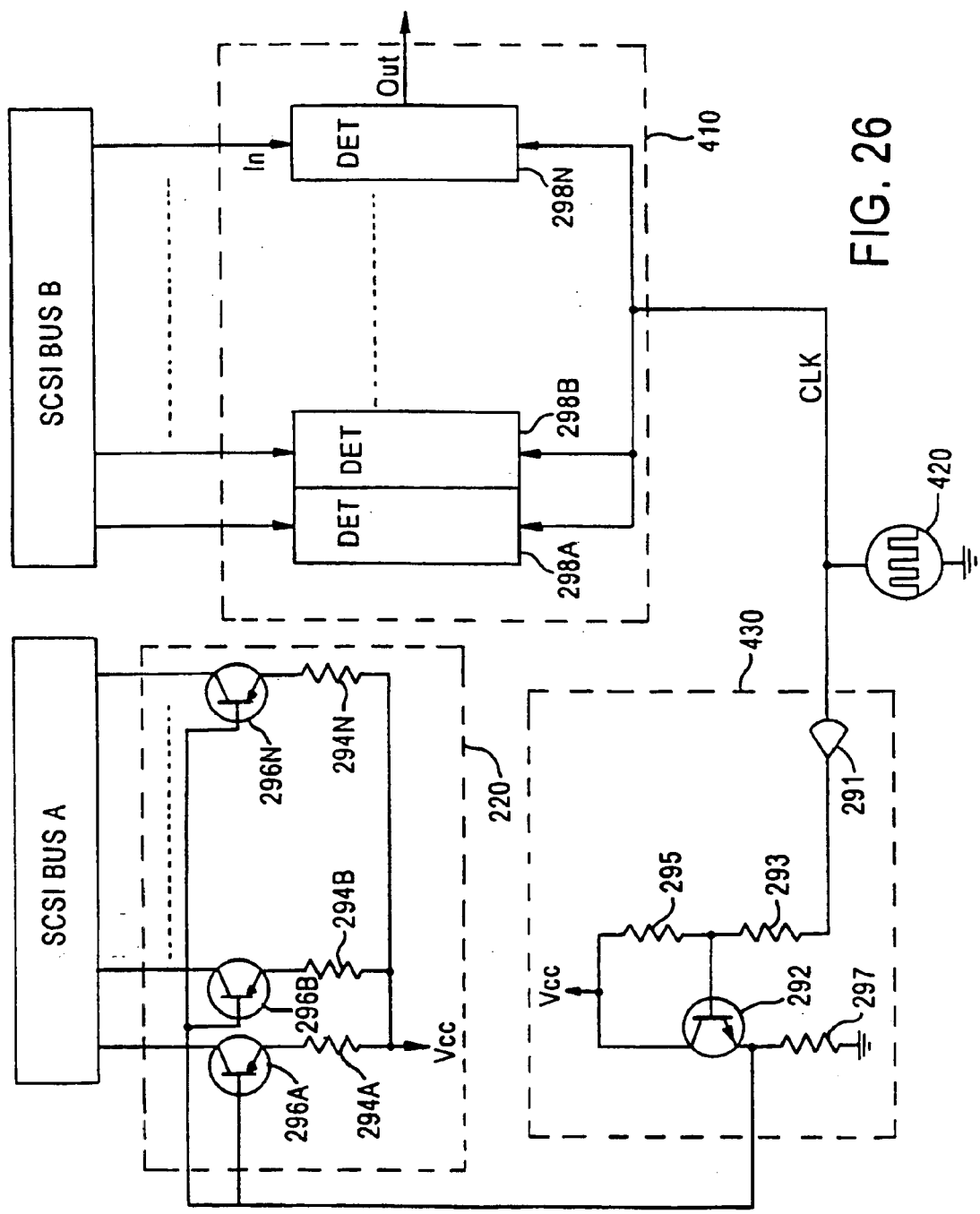
FIG. 26 is a diagram of circuitry for continuity checking.

FIG. 26 is a diagram showing an exemplary connection of the generator 430, clock 420, and injectors 220 and continuity check circuit 410, which are used in the continuity checking. The CLK signal from clock 420 is provided to both the injector generator circuit 430 and to the continuity check circuit 410. The CLK signal is input to jitter circuit 291 which keeps the injection generator synchronized and the output of jitter circuit 291 is provided to the base of NPN transistor 292 through a voltage divider since the based is connected to a node between serially connected resistors 293 and 295. This, in conjunction with the injectors, compensate for behavior changes of the transistors when the temperature varies. VCC is provided to another end of resistor 295 as well as to the collector of transistor 292. The emitter of transistor 292 is connected to an output node, which is also connected to ground through resistor 297. Consequently, the signal connected to the output node of transistor 292 will be an oscillating voltage, which is provided to the based of each injector of injectors 220. Each injector SCSI bus A is formed of a transistor 296 (for example, 296A to 296N) connected to VCC through a resistor 294 (for example, 294A to 294N). As connected, each of the injectors is a current source so that the signal at the base of each transistor 296 determines the amount of current that will be injected to a specific wire (of the bus). As a result, the same signal provided to the base of each transistor 294 is injected to each wire (of the bus). Connected to SCSI bus B is continuity check circuit 410 having a detector 298 for each signal wire of the bus (for example, 298A to 298N).

Figure 27:
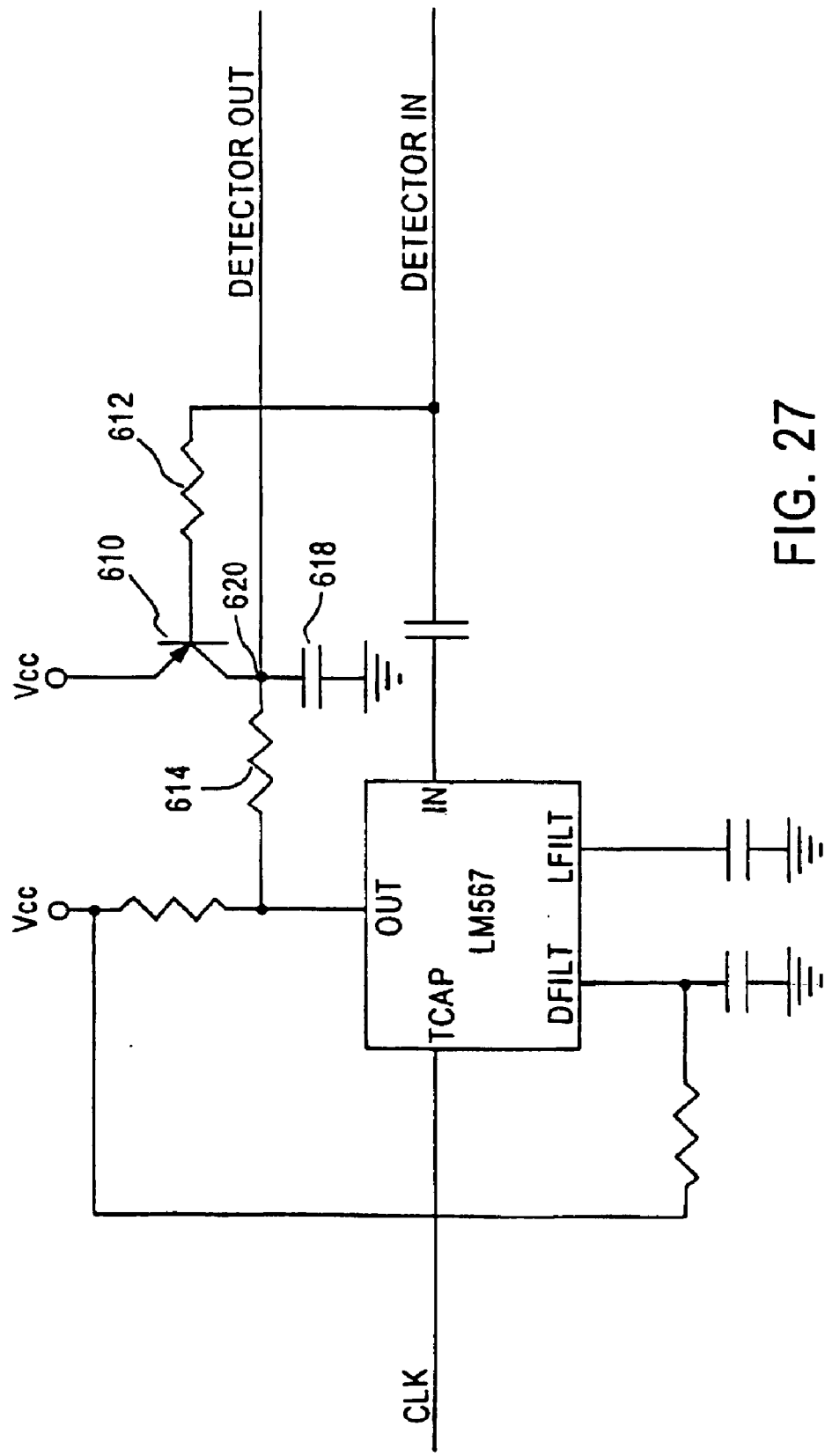
FIG. 27 is a circuit diagram of an example of the detector of FIG. 26.

FIG. 27 is a circuit diagram of an exemplary detector 298. Each detector receives the reference signal CLK and the detector IN signal from the bus line and looks for a frequency on the IN signal that is the same as that of the reference CLK. The reference CLK is provided to a frequency detector (or a Tone Detector, or a Phase Lock Loop (PLL)) which in one embodiment is an LM567 manufactured by National Semiconductor, which receives also the IN signal. The capacitors and resistors shown in FIG. 27 are those used in a typical configuration of the LM567. When the LM567 finds the reference frequency CLK in the detector IN signal, the OUT signal goes low; otherwise the OUT signal is high. Therefore, if there is a short circuit (circuit continuity across the switch), the output of the detector is low and when there is no short circuit (no circuit continuity) the output of the detector is floating (open collector).

Since the SCSI bus operates at a higher frequency than the frequency used for the continuity detection, it may contain also the detection frequency. Hence, there is a need to prevent false alarms. One way of doing so is checking for the injected signals only when the bus wire is at idle. In SCSI, this means the voltage is high (logical FALSE).

Transistor 610, resistors 612 and 614, and capacitor 618 are provided to disable detection whenever the IN signal is at the logical true (0V) level and shortly thereafter. The IN signal is provided to the base of PNP transistor 610 through resistor 612. The collector of transistor is 610 is connected to node 620 which is connected also to the detector OUT, to resistor 614 (connected to the output of the LM56) and to one end of capacitor 618. The other end of capacitor 618 is connected to ground. With this connection, whenever the IN signal is low, PNP transistor 610 is ON and capacitor 618 is charged which results in the detector signal OUT being high; i.e., no short is detected. When the IN signal is high, transistor 610 is OFF, and if the LM567 finds that the IN frequency matches the reference CLK frequency, the OUTPUT signal will be low. Consequently, capacitor 618 will discharge and the OUT signal of detector will go low, indicating a short circuit (circuit continuity).

Figure 28:
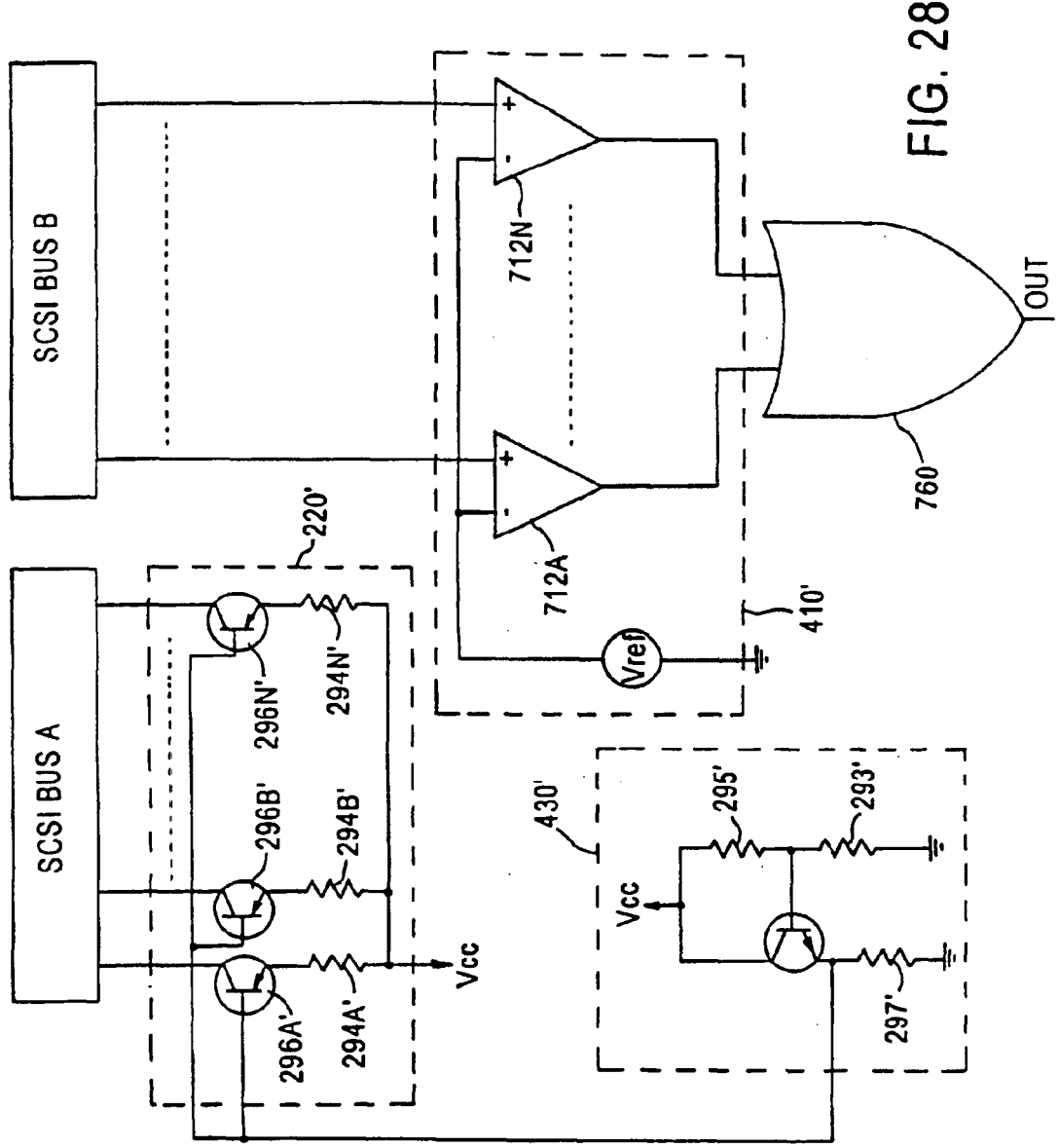
FIG. 28 is a diagram of another example of circuitry for continuity checking.

FIG. 28 is a circuit diagram of another exemplary connection of the connection illustrated in FIG. 26 with generator 430', injector 220' and continuity check circuit 410' used in continuity checking. Each injector 296' is similar to the injector 296 shown in FIG. 26, but has a constant voltage applied to the based of the PNP transistor 710 provided by constant voltage generator 430' instead of the generator 430. Therefore, a constant current is applied to each wire of the bus. Each detector is a voltage compactor 712 (712A to 712N), and if there is circuit continuity, the input to the compurgator 712 will be more than Vref and the output will be "1" indicating that there is a short circuit. Vref is selected so that under a normal SCSI bus, the output of the comparator will be "0" indicating no short circuit. As shown in FIG. 28, the output of the detectors 712A to 712N are input to a NOT gate 760.

In the foregoing description, the invention has been described with reference to specific embodiments thereof. It will, however, be evident that various modifications and changes may be made thereto without departing from the broader spirit and scope of the invention. For example, although the invention has been explained by showing linkages between two networks that the techniques described could be applied to network interconnection of three or more networks in a routine fashion. The specification and drawings are, accordingly, to be regarded in an illustrative way, rather than in a restrictive sense. For example, it should be clear, that although the invention has been explained by showing linkages between only two networks, that the techniques described could be applied to network interconnections of three or more networks in a routine fashion.

What is claimed is:

1. A method for transmitting data between an origin network and at least one destination network, each network having a network front end, the method comprising:

receiving data over the origin network at the front end of the origin network, wherein the received data complies with a first protocol;

stripping at least one protocol layer of the first protocol from the received data such that only a portion of the received data is selected;

transmitting the selected data from the front end of the origin network to the front end of the at least one destination network over at least one primitive network using a second protocol different from the first protocol; and when an ultimate destination of the transmitted data is not the front end of the at least one destination network, transmitting the selected data over the at least one destination network to the destination using a third protocol different from the second protocol.

2. The method of claim 1, wherein the first protocol and the third protocol are the same protocol.

3. The method of claim 2, wherein the first protocol and the third protocol are selected from the group consisting of TCP/IP, DECnet, Novell and SNA.

4. The method of claim 1, wherein the protocol of the primitive network is selected from the group consisting of SCSI, SCSI-2, SCSI-3, SPI, Fast-20, Fast-40, LVD, parallel data port, serial data port, USB, RS-232, ethernet, token ring, FDDI and ATM.

5. The method of claim 1, wherein said transmitting of the selected data from the front end of the origin network to the front end of the at least one destination network comprises:
transferring data from the front end of the origin network to at least one intermediate node; and
transferring the data from the at least one intermediate node to the front end of the at least one destination network.

6. The method of claim 5, further comprising:
inspecting the data received by at least one front end and deciding whether to block the transfer of the data received.

7. The method of claim 5, wherein after said receiving data and before said transmitting of the selected data over the at least one destination network to the destination, the respective front end can modify the data.

8. The method of claim 5, wherein prior to said transferring of data from the front end of the origin network to at least one intermediate node, the at least one intermediate node is electrically isolated from the front end of the at least one destination network, and said transferring of the data from the at least one intermediate node to the front end of the at least one destination network further comprises:
electronically isolating the at least one intermediate node from the front end of the origin network,
electronically connecting the at least one intermediate node to the front end of the at least one destination network, and
transferring the data from the at least one intermediate node to the front end of the at least one destination network.

9. The method of claim 8, wherein the at least one intermediate node is a storage device.

10. The method of claim 9, wherein after said electronically isolating of the at least one intermediate node from the front end of the origin network, the storage device is reset, except for its memory element.

11. The method of claim 9, wherein
the storage device has a read/write mode and a read-only mode, and
the storage device is normally in the read-only mode and is placed in the read/write mode only in response to a control signal.

12. The method of claim 8, wherein prior to said transferring of the data from the at least one intermediate node to the front end of the at least one destination network, the at least one intermediate node is placed in a read-only mode.

13. The method of claim 8, further comprising the step of:
inspecting the data received by at least one front end and deciding whether to block the transfer of the data received.

14. The method of claim 8, wherein after said receiving data and before said transmitting of the selected data over the at least one destination network to the destination, the respective front end can modify the data.

15. The method of claim 5, wherein the front end of the origin network is always electrically isolated from the front end of the at least one destination network.

16. The method of claim 15, further comprising:
constantly verifying with a control unit that the front end of the origin network is always electrically isolated from the front end of the at least one destination network.

17. The method of claim 16, wherein verifying that the front end of the origin network is always electrically isolated from the front end of the at least one destination network includes injecting a periodic wave on signal lines coming from one front end and detecting whether the wave is present on signal lines coming from the other front end.

18. The method of claim 16, wherein verifying that the front end of the origin network is always electrically isolated from the front end of the at least one destination network includes generating a DC signal shift on signal lines coming from one front end and detecting whether there is a shift of the DC signal on signal lines of a different front end.

19. The method of claim 5, wherein there are a plurality of destination networks each network having a network front end, prior to said transferring of data from the front end of the origin network to at least one intermediate node, the front ends of the plurality of destination networks are electrically isolated from the at least one intermediate node, and said transferring of the data from the at least one intermediate node to the front end of the at least one destination network further comprises the steps of:
electronically isolating the at least one intermediate node from the front end of the origin network,
a) electronically isolating the at least one intermediate nodes from the front ends of all but one of the plurality of destination networks,
b) transferring the data from the at least one intermediate node to the front end of a connected destination network, and
repeating a) and b) for each of the plurality of destination networks.

20. The method of claim 5, wherein the at least one intermediate node comprises a magnetic storage device.

21. The method of claim 20, wherein the data is always written to and read from a same position of the magnetic storage device.

22. The method of claim 5, wherein the front end of the origin network is always physically disconnected from the front ends of all networks.

23. The method of claim 5, wherein the at least one intermediate node comprises a memory device.

24. The method of claim 5, wherein the at least one intermediate node comprises a member of the group consisting of a computer, server, a workstation, a personal computer or dedicated hardware.

25. The method of claim 1, further comprising determining whether the data has been successfully transferred to the destination in the at least one destination network.

26. The method of claim 25, wherein
determining whether the data has been successfully transferred to the destination in the at least one destination network includes determining whether the data has been transferred to the destination within a predetermined time period.

27. The method of claim 1, wherein the said primitive network is not capable of transmitting data from the front end of the at least one destination network to the front end of the origin network.

28. The method of claim 1, further comprising the step of:
inspecting the data received by at least one front end and deciding whether to block the transfer of the data received.

29. The method of claim 1, wherein after said receiving data and before said transmitting of the selected data over the at least one destination network to the destination, the respective front end can modify the data.

30. A method for transmitting data between an origin network and at least one destination network, each network having a network front end, the method comprising:
receiving data over the origin network at the front end of the origin network, wherein the received data complies with a first protocol;
stripping at least one protocol layer of the first protocol from the received data such that only a portion of the received data is selected;
transmitting the selected data from the front end of the origin network to an intermediate node over a first primitive network using a second protocol different from the first protocol;
transmitting the selected data from the intermediate node to the front end of the at least one destination network over a second primitive network; and
when the transmission destination is not the front end of the at least one destination, transmitting the selected data over the at least one destination network to the transmission destination using a third protocol different from the second protocol.

31. The method of claim 30, further comprising the step of:
inspecting the data received by the intermediate mode and deciding whether to block the transfer of the data received.

32. The method of claim 30, wherein after said transmitting of the selected data from the front end of the origin network to an intermediate node over a first primitive network, the intermediate mode can modify the data.

33. A computer network comprising:
an origin network having an originating front end configured to receive data complying with at least a first protocol and to strip at least one protocol layer of the first protocol from the received data such that only a portion of the received data is selected;
at least one destination network having a destination front end, wherein the destination network communicates using data complying with at least a second protocol; and
at least one primitive network connected to said originating front end and to said destination front end and configured to transmit the selected data from the front end of the origin network to the front end of the at least one destination network using a protocol different from both the at least first protocol and the at least second protocol.

34. The computer network according to claim 33, wherein the at least first protocol and the at least second protocol are the same protocol.

35. The computer network according to claim 34, wherein at least one of the first and second protocols are selected from the group consisting of TCP/IP, DECnet and SNA.

36. The computer network according to claim 33, wherein the protocol of the primitive network is selected from the list consisting of SCSI, SCSI-2, SCSI-3, SPI, Fast-20, Fast-40, LVD, parallel data port, serial data port, USB, RS-232, ethernet, token ring, FDDI and ATM.

37. The computer network according to claim 33, wherein the primitive network is further configured to transfer the data from the front end of the origin network to at least one intermediate node and then transfer the data from the at least one intermediate node to the front end of the at least one destination network.

38. The computer network according to claim 37, wherein the at least one primitive network has a plurality of intermediate nodes and is further configured to transfer the information between the plurality of intermediate nodes prior to being transferred to the front end of the at least one destination network.

39. The computer network according to claim 37, wherein the at least one intermediate node comprises a magnetic storage device.

40. The computer network according to claim 39, wherein
the magnetic storage device has a read/write mode and a read-only mode, and
the magnetic storage device is normally in the read-only mode and is placed in the read/write mode only in response to a control signal.

41. The computer network according to claim 39, wherein the data is always written to a same position of the magnetic storage device.

42. The computer network according to claim 37, wherein the front end of the origin network is always physically disconnected from the front end of the at least one destination network.

43. The computer network according to claim 37, wherein the at least one intermediate node comprises a memory device.

44. The computer network according to claim 43, wherein the electronic memory includes a memory element,
a switching circuit changing connection to the memory element between the front end of the origin network and the front end of the at least one destination network, and
a plurality of other circuits, and
except for the memory element, the electronic memory is configured to be reset during each change of state of the switching circuit.

45. The computer network according to claim 43, wherein:
the memory device has a read/write mode and a read-only mode, and
the memory device is normally in the read-only mode and is placed in the read/write mode only in response to a control signal.

46. The computer network according to claim 37, wherein the at least one intermediate node comprises a computer.

47. The computer network according to claim 37, wherein the front end of the origin network is always electrically isolated from the front end of the at least one destination network.

48. The computer network according to claim 47, further comprising:
means for constantly verifying that the front end of the origin network is always electrically isolated from the front end of the at least one destination network.

49. The computer network according to claim 48, wherein the means for constantly verifying that the front end of the origin network is always electrically isolated from the front end of the at least one destination network includes
a periodic wave generator generating a periodic wave on lines connected to the front end of one of the at least one destination network and origin network, and
a detector detecting presence of the periodic wave one lines connected to the front end of one of the origin network and the at least one destination network.

50. The computer network according to claim 37, wherein the at least one intermediate node includes a circuit to prevent the front end of the at least one destination network from transferring any data to said at least one intermediate node.

51. The computer network of claim 37, further comprising means for determining whether the data has been successfully transferred to the front end of the at least one destination network from the origin network via the at least one intermediate node by determining whether the data has been transferred to the front end of the at least one destination network within a predetermined time period.

52. The computer network according to claim 33, wherein the said primitive network is not capable of transmitting data from the front end of the at least one destination network to the front end of the origin network.

53. The computer network according to claim 33, further comprising:
means for inspecting the data received at each front end and deciding whether to block the transfer of the data received at each front end.

54. The computer network according to claim 33, wherein the front end of at least one of the origin network and the at least one destination inspects and modifies the data received via the least one primitive network.

55. The method of claim 5, wherein
the intermediate node comprises at least a first and second storage device, and said transferring of data from the front end of the origin network to at least one intermediate node comprises connecting one of the first and second storage devices to the front end of the origin network while electrically isolating said one of the first and second storage devices from the front end of the at least one destination network, and connecting the other of the first and second storage devices to the front end of the at least one destination network while electrically isolating the other of the first and second storage devices from the front end of the origin network,
transferring data from the front end of the origin network to said one of the first and second storage device while transferring data from the front end of the at least one destination network to the other of the first and second storage devices,
connecting said one of the first and second storage devices to the front end of the at least one destination network while electrically isolating said one of the first and second storage devices from the front end of the origin network, and connecting the other of the first and second storage devices to the front end of the origin network while electrically isolating the other of the first and second storage devices from the front end of the at least one destination network, and
transferring data from said one of the first and second storage devices to the front end of the at least one destination network while transferring data from the other of the first and second storage devices to front end of the origin network.

56. The computer network according to claim 37, wherein the at least one intermediate node includes a switching circuit configured to connect the at least one intermediate node to the front end of the origin network while electrically isolating the intermediate node from the front end of the at least one destination network, and then connect the at least one intermediate node to the front end of the at least one destination network while electrically isolating the intermediate node from the front end of the origin network.

57. The computer network according to claim 56, wherein the at least one intermediate node further includes a storage device for storing the data transferred from the respective front ends, and except for the storage device, all elements of the intermediate node are configured to reset during each connection change of the switching circuit.

58. The method of claim 1, wherein the front end of at least one destination network, together with the protocol of the at least one primitive network, can restrict transmissions coming from and being passed to the at least one primitive net to at least one of a specific destination in the at least one destination network and a specific source in the origin network.

59. A machine readable medium having stored thereon instructions executable by a machine to perform a method of transmitting data between an origin network and at least one destination network, each network having a network front end, said method comprising:
receiving data over the origin network at the front end of the origin network, wherein the received data complies with a first protocol;
stripping at least one protocol layer of the first protocol from the received data such that only a portion of the received data is selected;
transmitting the selected data from the front end of the origin network to the front end of the at least one destination network over at least one primitive network using a second protocol different from the first protocol; and
when an ultimate destination of the transmitted data is not the front end of the at least one destination network, transmitting the selected data over the at least one destination network to the destination using a third protocol different from the second protocol.

60. The machine-readable medium method of claim 59, wherein in said method the first protocol and the third protocol are the same protocol.

61. The machine readable medium of claim 60, wherein in said method the first protocol and the third protocol are selected from the group consisting of TCP/IP, DECnet, Novell and SNA.

62. The machine readable medium of claim 59, wherein in said method the protocol of the primitive network is selected from the group consisting of SCSI, SCSI-2, SCSI-3, SPI, Fast-20, Fast-40, LVD, parallel data port, serial data port, USB, RS-232, ethernet, token ring, FDDI and ATM.

63. The machine readable medium of claim 59, wherein in said method said transmitting of the selected data from the front end of the origin network to the front end of the at least one destination network comprises:
transferring data from the front end of the origin network to at least one intermediate node;
transferring the data from the at least one intermediate node to the front end of the at least one destination network.

64. The machine readable medium of claim 63, wherein said method further comprises:
inspecting the data received by at least one front end and deciding whether to block the transfer of the data received.

65. The machine-readable medium of claim 63, wherein in said method after said receiving data and before said transmitting of the selected data over the at least one destination network to the destination, the respective front end can modify the data.

66. The machine readable medium of claim 63, wherein in said method:
prior to said transferring of data from the front end of the origin network to at least one intermediate node, the at least one intermediate node is electrically isolated from the front end of the at least one destination network, and said transferring of the data from the at least one intermediate node to the front end of the at least one destination network further comprises:

electronically isolating the at least one intermediate node from the front end of the origin network, electronically connecting the at least one intermediate node to the front end of the at least one destination network, and transferring the data from the at least one intermediate node to the front end of the at least one destination network.

67. The machine-readable medium of claim 66, wherein in said method the at least one intermediate node is a storage device.

68. The machine readable medium of claim 67 wherein in said method after said electronically isolating the at least one intermediate node from the front end of the origin network, the storage device is reset, except for its memory element.

69. The machine readable medium of claim 67, wherein in said method:

the storage device has a read/write mode and a read-only mode, and the storage device is normally in the read-only mode and is placed in the read/write mode only in response to a control signal.

70. The machine-readable medium of claim 66, wherein in said method prior to said transferring of the data from the at least one intermediate node to the front end of the at least one destination network, the at least one intermediate node is placed in a read-only mode.

71. The machine readable medium of claim 66, wherein said method further comprises:

inspecting the data received by at least one front end and deciding whether to block the transfer of the data received.

72. The machine-readable medium of claim 66, wherein in said method after said receiving data and before said transmitting of the selected data over the at least one destination network to the destination, the respective front end can modify the data.

73. The machine-readable medium of claim 63, wherein in said method the front end of the origin network is always electrically isolated from the front end of the at least one destination network.

74. The machine readable medium of claim 73, wherein said method further comprises:

constantly verifying with a control unit that the front end of the origin network is always electrically isolated from the front end of the at least one destination network.

75. The machine readable medium of claim 74, wherein in said method verifying that the front end of the origin network is always electrically isolated from the front end of the at least one destination network includes injecting a periodic wave on signal lines coming from one front end and detecting whether the wave is present on signal lines coming from the other front end.

76. The machine readable medium of claim 74, wherein in said method verifying that the front end of the origin network is always electrically isolated from the front end of the at least one destination network includes generating a DC signal shift on signal lines coming from one front end and detecting whether there is a shift of the DC signal on signal lines of a different front end.

77. The machine readable medium of claim 63, wherein in said method:

there are a plurality of destination networks each network having a network front end, prior to said transferring of data from the front end of the origin network to at least one intermediate node, the front ends of the plurality of destination networks are electrically isolated from the at least one intermediate node, and said transferring of the data from the at least one intermediate node to the front end of the at least one destination network further comprises the steps of:

electronically isolating the at least one intermediate node from the front end of the origin network, a) electronically isolating the at least one intermediate nodes from the front ends of all but one of the plurality of destination networks, b) transferring the data from the at least one intermediate node to the front end of a connected destination network, and repeating a) and b) for each of the plurality of destination networks.

78. The machine-readable medium of claim 63, wherein in said method the at least one intermediate node comprises a magnetic storage device.

79. The machine-readable medium of claim 78, wherein in said method the data is always written to and read from a same position of the magnetic storage device.

80. The machine-readable medium of claim 63, wherein in said method the front end of the origin network is always physically disconnected from the front ends of all networks.

81. The machine-readable medium of claim 63 wherein in said method the at least one intermediate node comprises a memory device.

82. The machine readable medium of claim 63, wherein in said method the at least one intermediate node comprises a member of the group consisting of a computer, server, a workstation, a personal computer or dedicated hardware.

83. The machine-readable medium of claim 59 wherein said method further comprises determining whether the data has been successfully transferred to the destination in the at least one destination network.

84. The machine readable medium of claim 83, wherein in said method:

determining whether the data has been successfully transferred to the destination in the at least one destination network includes determining whether the data has been transferred to the destination within a predetermined time period.

85. The machine readable medium of claim 59, wherein in said method the primitive network is not capable of transmitting data from the front end of the at least one destination network to the front end of the origin network.

86. The machine readable medium of claim 59, said method further comprises:

inspecting the data received by at least one front end and deciding whether to block the transfer of the data received.

87. The machine-readable medium of claim 59, wherein in said method after said receiving data and before said transmitting of the selected data over the at least one destination network to the destination, the respective front end can modify the data.

88. The machine readable medium of claim 63, wherein in said method:

the intermediate node comprises at least a first and second storage device, and said transferring of data from the front end of the origin network to at least one intermediate node comprises:

connecting one of the first and second storage devices to the front end of the origin network while electrically isolating said one of the first and second storage devices from the front end of the at least one destination network, and connecting the other of the first and second storage devices to the front end of the at least one destination network while electrically isolating the other of the first and second storage devices from the front end of the origin network, transferring data from the front end of the origin network to said one of the first and second storage device while transferring data from the front end of the at least one destination network to the other of the first and second storage devices, connecting said one of the first and second storage devices to the front end of the at least one destination network while electrically isolating said one of the first and second storage devices from the front end of the origin network, and connecting the other of the first and second storage devices to the front end of the origin network while electrically isolating the other of the first and second storage devices from the front end of the at least one destination network, and transferring data from said one of the first and second storage devices to the front end of the at least one destination network while transferring data from the other of the first and second storage devices to front end of the origin network.

89. The machine readable medium of claim 59, wherein in said method the front end of at least one destination network, together with the protocol of the at least one primitive network, can restrict transmissions coming from and being passed to the at least one primitive network to at least one of a specific destination in the at least one destination network and a specific source in the origin network.

90. The method of claim 1, further comprising implementing the front end of the origin network, the front end of the at least one destination network and the at least one primitive network by the same organizational entity such that the organizational entity controls operation of the front end of the origin network, the front end of the at least one destination network and the at least one primitive network.

91. The method of claim 90, wherein said implementing comprises implementing the front end of the origin network, the front end of the at least one destination network and the at least one primitive network at the same office of the organizational entity.

92. The method of claim 30, further comprising implementing the front end of the origin network, the front end of the at least one destination network, the first primitive network, the intermediate node and the second primitive network by the same organizational entity such that the organizational entity controls operation of the front end of the origin network, the front end of the at least one destination network, the first primitive network, the intermediate node and the second primitive network.

93. The method of claim 92, wherein said implementing comprises implementing the front end of the origin network, the front end of the at least one destination network, the first primitive network, the intermediate node and the second primitive network at the same office of the organizational entity.

94. The computer network according to claim 33, wherein the originating front end, the destination front end and the at least one primitive network are implemented by the same organizational entity such that the organizational entity controls operation of the originating front end, the destination front end and the at least one primitive network.

95. The computer network according to claim 94, wherein the originating front end, the destination front end and the at least one primitive network are implemented at the same office of the organizational entity.

96. The machine readable medium of claim 59, wherein said method further comprises implementing the front end of the origin network, the front end of the at least one destination network and the at least one primitive network by the same organizational entity such that the organizational entity controls operation of the front end of the origin network, the front end of the at least one destination network and the at least one primitive network.

97. The machine readable medium of claim 96, wherein in said method said implementing comprises implementing the front end of the origin network, the front end of the at least one destination-network and the at least one primitive network at the same office of the organizational entity.

98. The method of claim 1, further comprising providing, by the front end of the destination network, data for encapsulating the selected data into the third protocol.

99. The method of claim 30, further comprising providing, by the front end of the destination network, data for encapsulating the selected data into the third protocol.

100. The computer network according to claim 33, wherein the destination front end is configured to provide data for encapsulating the selected data into the at least second protocol.

101. The machine readable medium of claim 59, wherein said method further comprises providing, by the front end of the at least one destination network, data for encapsulating the selected data into the third protocol.

102. The method of claim 1, wherein said stripping prevents control data in the data received over the origin network from passing through to the at least one destination network.

103. The method of claim 30, wherein said stripping prevents control data in the data received over the origin network from passing through to the at least one destination network.

104. The computer network according to claim 33, wherein said originating network is configured to prevent control data from the data received over the origin network from passing through to the at least one destination network.

105. The machine readable medium of claim 59, wherein in said method said stripping prevents control data in the data received over the origin network from passing through to the at least one destination network.

106. A method for transmitting data between an origin network and at least one destination network, each network having a network front end, the method comprising:

receiving data over the origin network at the front end of the origin network, wherein the received data complies with a first protocol;

stripping at least one protocol layer of the first protocol from the received data such that only a portion of the received data is selected;

transmitting the selected data from the front end of the origin network to the front end of the at least one destination network over at least one network using a second protocol different from the first protocol; and when an ultimate destination of the transmitted data is not the front end of the at least one destination network, transmitting the selected data over the at least one destination network to the destination using a third protocol different from the second protocol.

* * * * *